Aug. 18, 1936.  W. D. FOSTER ET AL  2,051,036
FILM HANDLING APPARATUS AND CONTROL THEREFOR
Filed Jan. 23, 1933  6 Sheets—Sheet 1

INVENTORS.
WARREN DUNHAM FOSTER
FREDERICK DAVENPORT SWEET
BY Warren D. Foster
ATTORNEY.

Aug. 18, 1936.  W. D. FOSTER ET AL  2,051,036
FILM HANDLING APPARATUS AND CONTROL THEREFOR
Filed Jan. 23, 1933  6 Sheets-Sheet 2
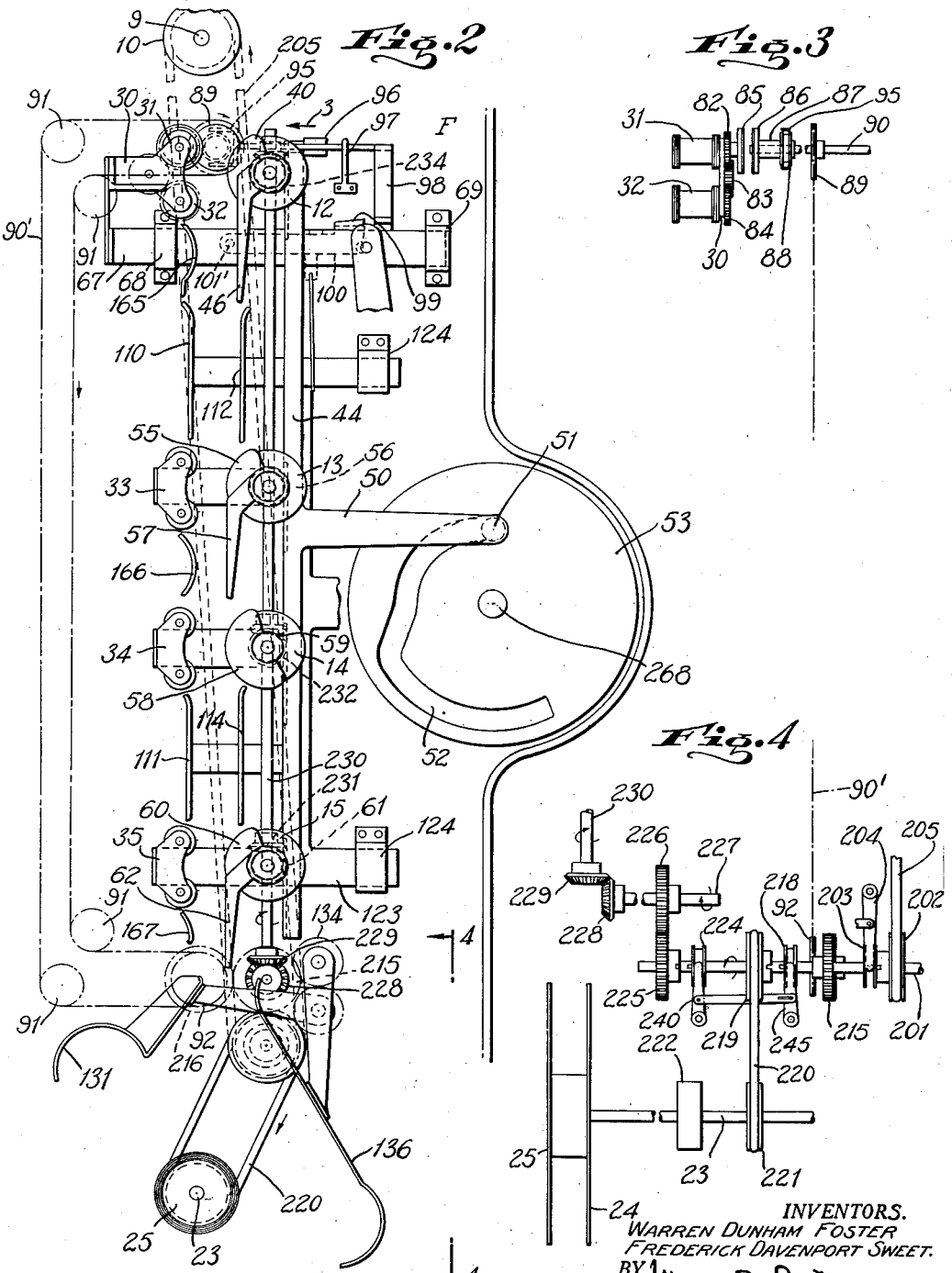
INVENTORS.
WARREN DUNHAM FOSTER
FREDERICK DAVENPORT SWEET.
BY Warren D. Foster
ATTORNEY.

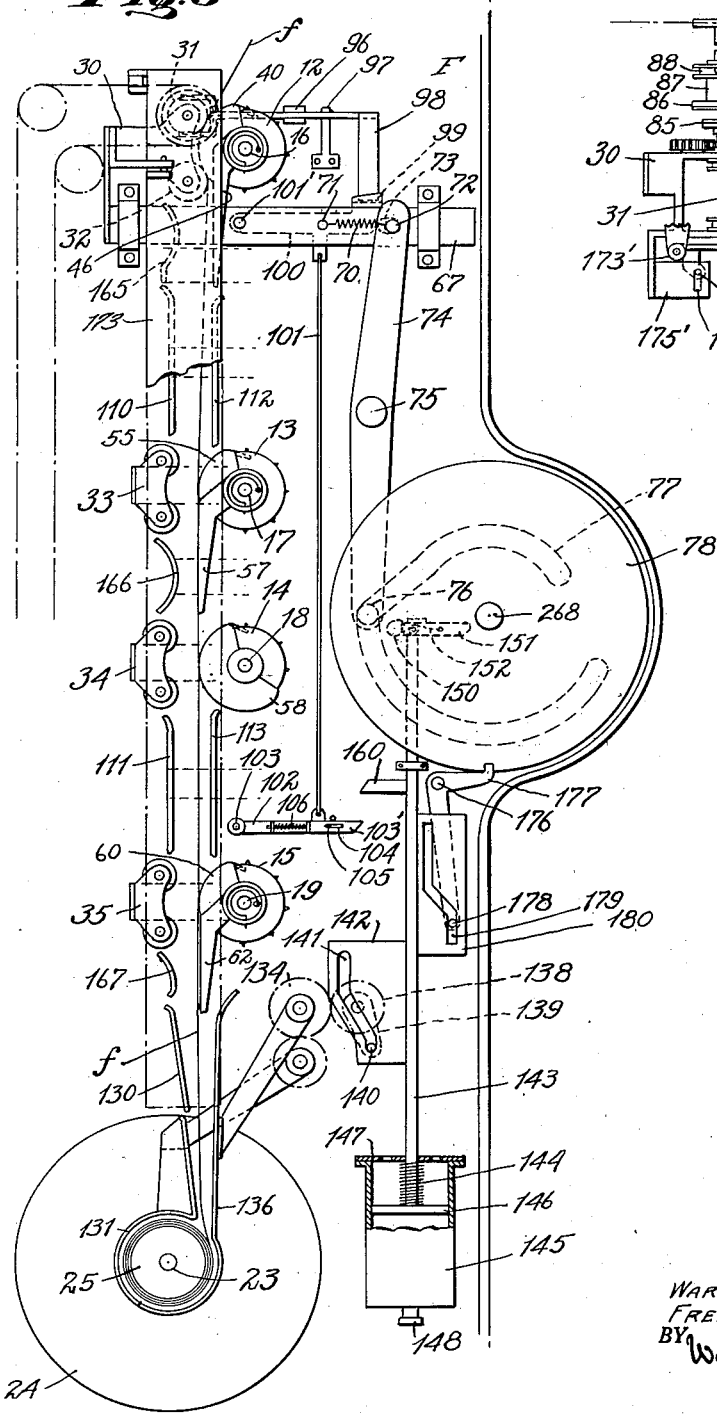
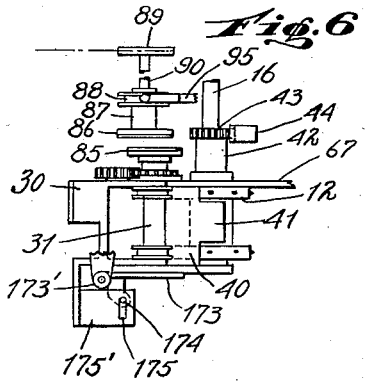

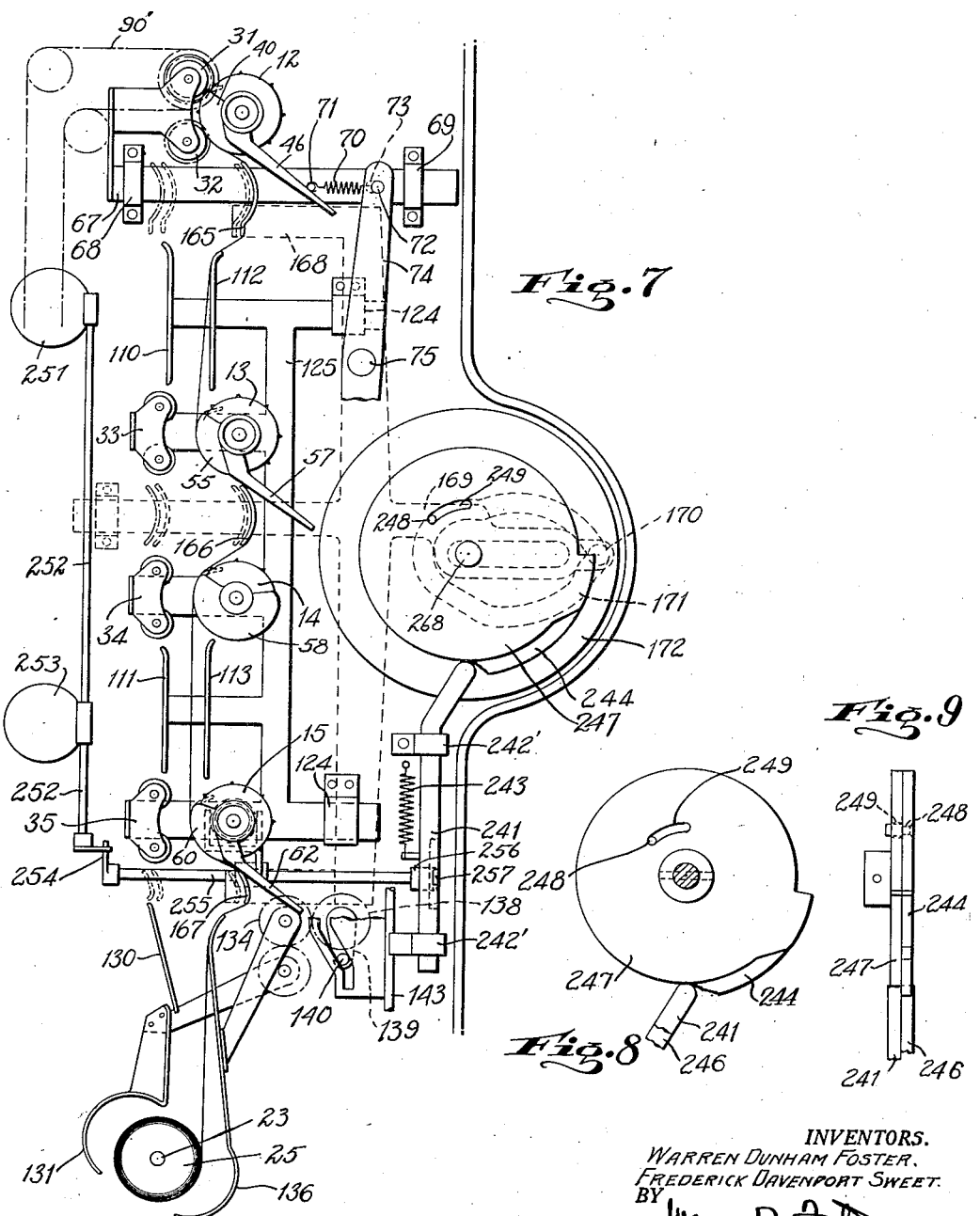

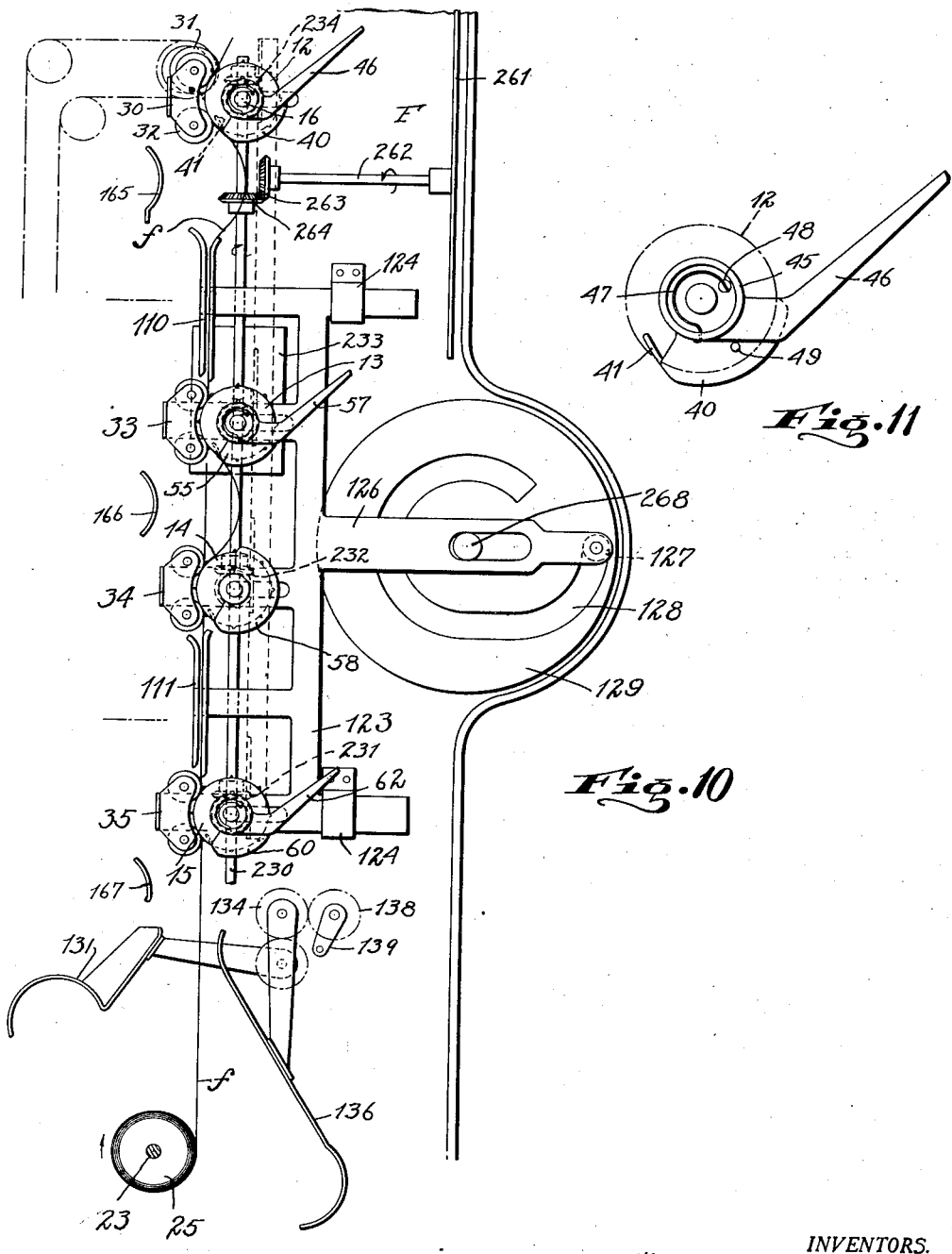

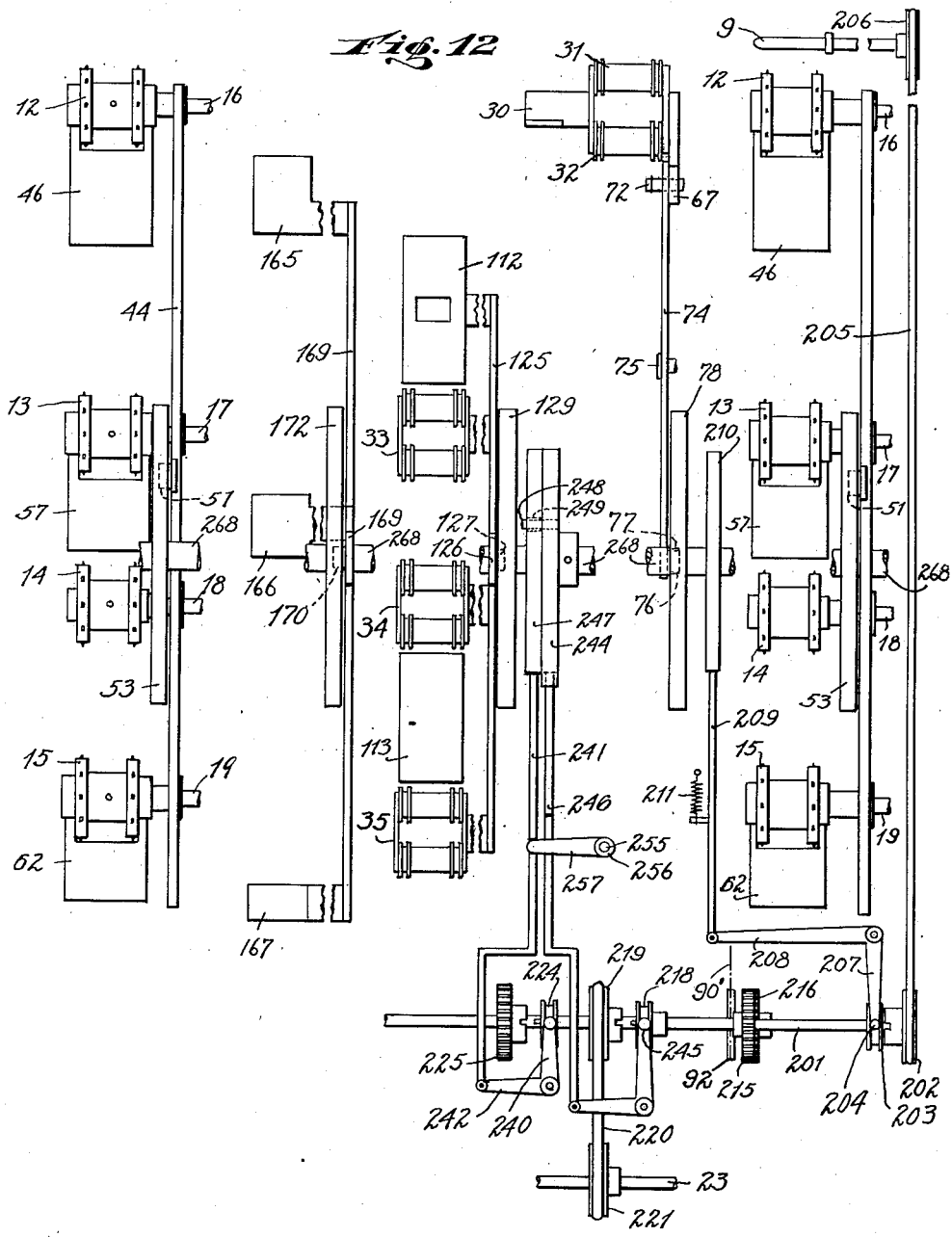

UNITED STATES PATENT OFFICE 2,051,036

FILM HANDLING APPARATUS AND
CONTROL THEREFOR

Warren Dunham Foster, Washington Township,
Bergen County, N. J., and Frederick Davenport
Sweet, New York, N. Y., assignors, by direct
and mesne assignments, to Kinatome Patents
Corporation, a corporation of New York Application January 23, 1933, Serial No. 653,140

80 Claims. (Cl. 88—16.2)

The present invention relates broadly to the art of photography and more particularly to improvements in apparatus for the handling of films, whether for the projection or taking of successive pictures or for the reproduction or recordation of images representing sound or for such projection of pictures and reproduction of sound jointly or such taking of pictures and recordation of sound jointly. It will be readily understood, however, that the present invention is applicable to many other uses.

An object of the present invention is to provide means for automatically placing a film in full operative relation with all of the operable elements of the film handling and sound reproducing or recording mechanism and also to create the necessary loops of slack film, all of the necessary operations being performed automatically and in an improved manner under the control of a single actuating member. Such automatic apparatus is designed particularly for the use of amateurs but is equally well adapted to professional use.

In certain of its aspects the present invention is an improvement upon the co-pending application of Barton Allen Proctor, Serial Number 54,910, filed September 8, 1925 now Patent Number 1,894,963. In said Proctor patent means are employed under the control of an interlocked actuating mechanism to provide the compensation necessary because of the difference of character of movement of the continuously operating delivery and take-up members and intermittently operating feeding or pull-down member disposed therebetween. Such compensating means include two members which engage the film on opposite sides of the intermittent pull-down and are operated in timed relation to every other operable element of the apparatus. The particular form of compensation, however, which is illustrated in the said Proctor patent, is the Bundick and Proctor tension control system of feeding, which is described and claimed in the co-pending application of Clarkson Ulysses Bundick and the said Proctor, Serial Number 44,482, filed July 18, 1925. Under this system as used for purposes of illustration in the said Proctor Patent Number 1,894,963, each of the tension arms after it has been operated to increase the length of film available between the continuous members and the intermittent pull down remains continuously in contact with the film throughout the projecting operation to control the feeding in accordance with said Bundick and Proctor system of tension control feeding. Under this system of feeding, no portion of the film moves continuously at an unvarying rate of speed. Such apparatus has proved highly efficient for the projection and taking of pictures which do not involve the projection or photographic recordation of an image representing sound. Such images representing sound according to conventional practice must be either projected or recorded from or upon a film which is traveling at a constant speed. An object of the present invention is to apply said Proctor system of control to a film which moves continuously at a constant speed from which sound may be projected or upon which sound may be recorded in conventional fashion.

In the co-pending applications of the present applicants, Serial Number 347,959, filed March 18, 1929, and Serial Number 352,525, filed April 14, 1929, now Patent Number 1,993,735, and in the application of Warren Dunham Foster, Serial Number 356,564, filed April 19, 1929, now Patent Number 1,943,305, apparatus is described and claimed in which the necessary loops of slack film are created by the selective revolution of the continuous sprockets and/or the intermittent pull-down, such selective revolution being controlled in timed relation to the control of all the other operable elements of the apparatus. The present invention utilizes loop-forming members, separate from the regular film feeding members, which engage the film and move it in a direction lateral to its normal course of travel, thereby creating the loops and thereafter moving out of the way of the loops as they contract and expand in the normal feeding operation, such movement in both operations being of course automatic and inter-related with the control of all other operable parts of the apparatus. It will be seen, therefore, that in some of its aspects the present invention has among its objects the presentation of improvement or a substitute for the apparatus described and claimed in the three last above mentioned co-pending applications.

A further object of our invention is to provide improved means for creating a loop of slack in the film. It has been proposed to create such loops in the film, first, by displacing it from its normal line of travel in a direction normal thereto while the film is being seated upon the teeth of the feeding members or, second, for so displacing it after it has been so seated. In apparatus of the first character which has been proposed the film is very likely to be torn as it moves over the edge of the teeth, particularly since apparatus of this type moves the film by hand and without the provision of control mechanism to insure slow movement. In the second type of apparatus, the sprockets may be moved backwardly by the film thus placing a considerable strain upon the film and necessitating a more complicated structure. In our improved apparatus we completely shield the film from the teeth of the feeding members and form the loops by displacing the film laterally from its path while the feeding members are completely shielded. Thus we draw the film over a smooth surface with no contact with the teeth during the loop forming operation and thus avoid wear and the possibility of damaging or destroying the perforations.

Another related object of our invention is to draw all of the film which is necessary for the loops from the supply upon the delivery reel. In other apparatus which produces the loops by a movement of a member at right angles to the line of travel of the film, the extra film necessary for the loops is drawn from both the take-up and the delivery reels. As a consequence an additional amount must be placed upon the take-up reel either by hand or by the combination of a self-threading take-up guide with a loop producing member. Upon occasions, there is insufficient film placed upon the take-up and the production of the loops therefore separates the leading end of the film from the hub of the take-up carrier. No such difficulty exists in our apparatus, since the continued operation of the preliminary feeding mechanism continually delivers more film to the loop producing members and opposes by its power drive any effective backward pull of the film from the take-up spindle. Alternatively we may fasten the take-up spindle against backward movement during the threading operation.

A further object of the present invention is to provide improved apparatus, separate from the regular feeding apparatus, for initially threading the film. This improvement consists in utilizing the rollers of a presser member associated with the delivery sprocket, and also with the other sprockets as desired, for pressing the film during a preliminary threading operation against the smooth surfaces of the appropriate shielding member or members thereby propelling it end-wise by frictional engagement through the threading path. In all other apparatus, except that described and claimed in our above-mentioned applications, so far as known to applicants, in which the end of a film is propelled through the apparatus for threading, difficulty has been experienced in securing initial engagement of the teeth of the sprockets with the perforations of the film unless the end of the film is cut absolutely square. Even in such cases the film does not always correctly thread itself. If difficulty of this or other nature does arise during this preliminary threading as a consequence the progress of the film is interrupted but the toothed members continue to revolve thereby either destroying the perforations and often the film itself or straining the perforations. Under the present invention the frictional contact of the smooth roller against a smooth surface avoids this difficulty. Also, the driven pressure members are resiliently held against the film, thus further protecting it. It will be readily seen, therefore, that an important object of the present invention is to furnish preliminary positioning means of an improved nature which overcomes the difficulties which have been previously experienced.

In all apparatus in which self-threading or end propulsion is employed it has been found necessary to establish a clear channel for the film and later to destroy this clear channel so that the loops of the film may expand and contract during the normal projection operation. In the past shielding members have been employed together with operable channel forming members. An object of the present invention is to combine a channel forming and a shielding means so that the results of both are obtained by one improved means. A related object is to furnish a yielding channel forming member so as to protect the film should it move laterally to its normal course of travel and in the operations which are necessarily carried out after the projection operation, such as rewinding, for example.

A further object of the invention is to provide means whereby the members of the apparatus associated with the picture aperture are controlled in timed and other interlocked relation with the operable members associated with the sound aperture. Another related object of the invention is to apply the control mechanism of the said co-pending Proctor Patent Number 1,894,963, to the operable members associated with the sound aperture, and to control the members associated therewith in timed or sequential relation to the control of the other operable elements of the apparatus.

Another object of the invention is to provide rewinding means automatically inter-related with the other operable elements of the apparatus including those associated with the sound aperture.

Another object of the invention is to provide improved control means for all of the operable parts of a sound motion picture machine for operating all of such parts in a predetermined sequential or other relation. A related object is the provision of control means for a film handling apparatus in which a plurality of separate control members are employed, the movement of each of said members controlling one of the operable members or a group of related operable members, and all of said control members being movable together. In the preferred form of our invention, which we are presenting herewith for purposes of illustration, we show a plurality of rotatable discs, each provided with a cam slot or cam slots and a connection between each of said slots and a member or members to be operated thereby, all of said discs being joined for rotation together. The relative simplicity and cheapness of such control construction are obvious.

Other advantages and characteristics of the present invention are apparent in the following description, the attached drawings and the subjoined claims. Although we are showing one preferred embodiment of our invention merely for purposes of illustration it is of course understood that we are not limiting ourselves to any particular construction, as changes can readily be made without departing from the spirit of our invention or the scope of our broader claims.

In the drawings:

Figure 1 is a side view, largely diagrammatic, of our apparatus, in projection or running position, with the control mechanism in the position known for convenience as "station 1."

Figure 2 is a skeleton view showing the film guiding parts disposed as in the hand threading or rewinding position, all of the toothed members being shielded and an unimpeded channel being formed between the delivery and take-up carriers. In this position the control mechanism is shown in the position known for convenience as station 3. In this and each of the similar following views for clarity and simplicity only the one of the control discs most closely associated with the particular disposition of the parts is shown.

Figure 3 is a detail view looking in the direction of the arrow 3 upon Figure 2.

Figure 4 is a view taken on the line 4—4 of Figure 2 looking in the direction of the arrows. This view shows the clutches for the power train, such clutches here being shown in the rewinding position, some parts being omitted for clarity.

Figure 1:
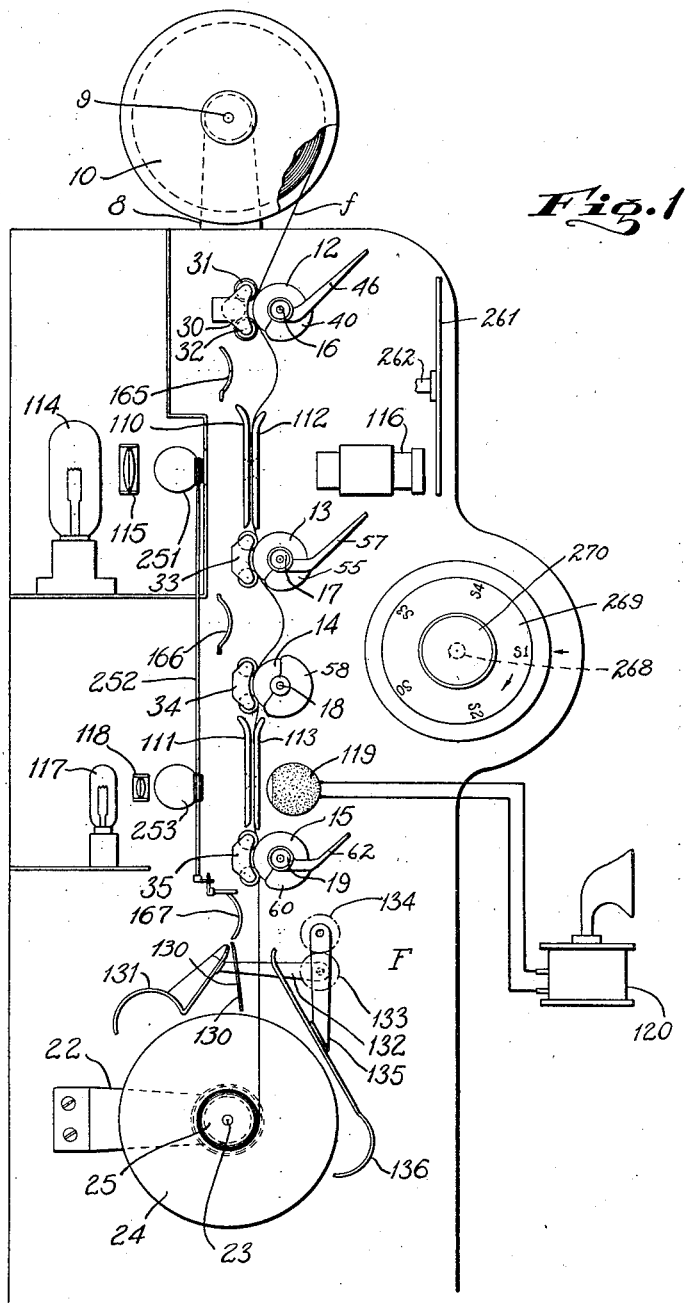

Figure 5 is a skeleton view showing the parts in the automatic threading position, the control mechanism being at the position known for convenience as station 0. With the mechanism disposed as here shown, the user places the film between the rollers of the upper idler and the surface of the opposite shielding member and the film is automatically propelled to the take-up carrier and automatically guided thereon, both the take-up carrier and the rollers of the top idler being driven and the channel therebetween being unimpeded.

Figure 6 is a top plan view showing the arrangement and driving means and control therefor of these idlers and the control of the movable gate plate.

Figure 7 is a view, corresponding to those of Figures 2 and 5, but showing the loop formers as having operated, the take-up guide beginning to open, and the channel-forming member being moved out of guiding position, the control mechanism being in the position known for convenience as "station 2."

Figures 8 and 9 are detailed views of the control mechanism for the take-up clutch and main clutch.

Figure 10 is a skeleton view showing the operable elements in the running or projection position, as in Figure 1, with the control mechanism at station 1.

Figure 11 is a view of the combined shielding and guiding elements.

Figure 12 is a diagram of the apparatus viewed from the side, the various control discs and the parts operated thereby for clarity being separated laterally from each other and being repeated as demanded for clarity.

A general understanding of the invention and its method of operation can be readily secured by a comparison of Figures 2, 5, 7, 10 (or 1) and 2, in that order, in which we show, largely diagrammatically, the various film engaging members disposed in the hand threading, automatic threading, loop-forming, projecting, and rewinding positions respectively. These positions are known for convenience as "station 3", "station 0", "station 2", "station 1" and "station 4" respectively. These stations generally correspond to those similarly designated in the other co-pending applications to which reference is made herein.

Figure 2 shows diagrammatically the disposition of the film contacting parts for the hand threading and rewinding positions. The control mechanism is shown disposed at station 4. The movement of the control mechanism to station 3 does not bodily move the guiding and other film contacting members. Such movement affects the rewinding driving means only. When the unitary control mechanism is so disposed (station 3 or 4) all of the shielding members are in shielding position, the gate, presser and guiding members are sufficiently removed from each other so that a clear channel is provided from the delivery reel to the take up reel in which as desired the user may position the film by appropriate lateral manual movements thereof or through which the film may be rewound.

If, as is primarily intended, however, the user wishes to thread the film automatically by endwise propulsion, he places the full reel upon the delivery spindle and makes the appropriate movement of the control mechanism which brings the apparatus into the position called for convenience "station 0", which is illustrated diagrammatically in Figure 5. From this figure it will be noted that a narrow enclosed channel is provided between the delivery sprocket and the take up spindle with all of the toothed members shielded and the guiding members in guiding position. The presser members associated with the delivery sprocket, however, will be seen to have been moved into contact with the shielding member associated with the delivery sprocket. The movement of the control mechanism to the 0 position has been automatically effected not only for disposing the various guiding members as so indicated in Figure 2, but also for bringing this presser member into close relation with the shielding member and for applying power to its two rollers and to the take-up spindle. The user then places the free end of the film between the top roller and the shield, this roller now revolving. This roller by frictional engagement only forces the film through the entire threading pathway and about the core of the reel or the take-up spindle which it will be understood is also revolving. When a sufficient amount of film has been coiled upon the take-up reel the revolution of the rollers automatically stops. During this automatic threading operation the control mechanism is automatically locked so that the user cannot interfere with the automatic operation, but at its conclusion a latch is automatically released so that the subsequent threading operation can be carried out.

The user thereupon moves the control mechanism into the position known for convenience as station 2. As will be seen from the diagram of Figure 7, the three loop-forming members form the two conventional loops and a third but smaller loop, the purpose of which will be later stated, by pushing the film across the threading channel. The teeth of the sprockets are not exposed until after the loops have been formed. As a consequence the film is merely pulled over a smooth surface without interference by the teeth. After the formation of the loops there is a slight additional movement of the loop-forming members which is sufficient merely to draw the film over the appropriate teeth of the respective members and to seat the proper perforations thereupon. After the loop formers have formed the loops, the combined shielding and guiding mechanisms are automatically moved out of the way of the loops. The loop which is associated with the third continuous feeding member is for the purpose of supplying the small amount of film which is necessary for the latter portion of the threading operation, that is, for assuring the proper seating of the film upon this third continuous feeding member. The continued operation of the take-up spindle during this loop forming operation supplies sufficient traction to the film to insure that the film necessary for the loops is drawn from the delivery carrier.

The user thereupon continues the movement of the control mechanism until it is in the position shown diagrammatically by Figures 10 and 1 in which the loops are fully formed, the take-up spindle guide out of guiding position, and the loop-forming members fully withdrawn from contact with the film thereby permitting the expansion and contraction of the loops. This final operation of the guiding members to the running position has also been effective to apply power to the various feeding members.

During all of these operations and until the film has been finally and fully placed in motion in the projection direction, the film has been shielded from the heat of the light source and the exciter lamp for the photo-electric cell has been maintained without effect upon the cell, thus rendering the loud speaker ineffective. As soon as the normal projecting operation begins, however, both light sources at once and automatically become effective.

It will be understood, therefore, that only three manual operations are required of the user. He places the delivery member upon the delivery spindle and places the end of the film in contact with the frictional rollers. Thereupon he moves the control handle from the threading position (S—3) to the running position (S—1), the necessary dwell in this movement being assured by the locking of the control mechanism for the period which is necessary for the film to move from the delivery sprocket to the proper position upon the take-up spindle.

At the conclusion of this operation, if the user wishes to rewind the film, he merely moves the control handle to the rewinding position and the rewinding is automatically carried out. During the rewinding operation, and in fact at all times when the film is not being regularly projected, the exciter lamp, as well as the picture light source, is maintained ineffective.

In the particular form of our invention which we have chosen to show as illustrative, we provide a main frame F upon which we mount the elements of the apparatus.

Mounted upon a suitable bracket 8, which extends upwardly from the frame F, is a delivery spindle 9 upon which we mount a delivery reel 10 for the film f. The elements which normally move the film during the projecting operation are a first continuous or delivery sprocket 12, an intermittent sprocket 13, a second continuous or take-up sprocket 14, and a third continuous or sound take-up sprocket 15, mounted upon driving shafts 16, 17, 18 and 19 respectively. All of these sprockets are toothed in the conventional manner. Mounted upon a bracket 22 attached to the frame F is a take-up spindle 23 upon which we mount a take-up reel 24, this reel having a conventional core or hub 25.

Associated with each of the sprockets is a presser member. The presser member for the delivery sprocket 12 consists of a frame 30 in which are journalled smooth rollers 31 and 32 which are driven in the manner shown in Figure 3 and later described. Associated with the other sprockets 13, 14 and 15, respectively, are similar presser members 33, 34 and 35, each of which is similarly constructed. The rollers of these other presser members are shown as not being driven during the preliminary threading operation but if desired they may be driven as is the presser member associated with the delivery spindle.

Under certain conditions, we may prefer to drive the delivery reel in a feeding direction, in the manner shown and claimed in our above-mentioned co-pending application, Serial Number 352,525, now Patent Number 1,993,735. In such cases we dispense with the drive for the presser rollers associated with the delivery sprocket and use, if desired, a delivery spindle guide as of the sort described and claimed in our last previously mentioned co-pending application.

Associated with each of the toothed feeding sprockets is a combined shielding and guiding means of the sort shown in Figure 11. Since all of these means are similarly constructed only one will be described.

The shielding means 40 may be of the sort described and claimed in our last previously mentioned co-pending application in which a stripping extension 41 extends from a shielding body in order to strip the film from the teeth of the sprocket 12 after the shielding means has been removed from the shielding position. This shield is mounted for rotation coaxially with the sprocket 12 upon a collar 42, as is clearly evident from Figure 6 of the drawings, this collar surrounding the sprocket driving shaft 16. Movable with this collar is a gear 43 which meshes with a toothed rack 44, movement of the rack being effective to rotate the shield. A collar 45 is formed in a guiding member 46 and is mounted for rotation upon the shielding body 40. Slight relative movement between the guiding member 46 and the shielding body 40 is provided by a spring 47, one end of which is attached to a pin 48 which is fixed to the shielding body 40 and the other end of which is fixed to the collar 45 of the guiding member 46. A pin 49 limits such movement.

As is clearly shown in Figure 2, the toothed rack 44 is moved by an extension thereof 50 (to the right as viewed in Figure 2) in which is mounted a roller 51 which operates in a cam slot 52 in a control disc 53. As will be apparent, the rotation of the disc 53 will move the rack 44 in a vertical direction, thus operating the shield 40 and the guiding member 46.

As previously stated, the operation of the other shields and guiding members is similar. Shield 55 associated with the intermittent sprocket 13 is operated by a pinion 56 meshing with the rack 44. A guiding element 57 is mounted upon the shield 55 similarly to the mounting of the guiding element 46 upon the shield 40. A shield 58 associated with the second continuous feeding sprocket 14 is operated by a pinion 59 meshing with the rack 44. Similarly, a shield 60 associated with the third continuous sprocket 15 is moved by a pinion 61 meshing with the rack 44, and this shield carries a guiding element 62 which is mounted thereupon similarly to the mounting of the guiding element 47 upon the shield 40.

The presser rollers associated with the first continuous feeding member during automatic threading operation are driven in a feeding direction. At this time, when the control mechanism is at "station 0", the presser means is in the position shown in Figure 5. The two rollers 31 and 32 are effective to press the film against the smooth surface of the shield 40. Movement of the frame 30 in which these rollers are journalled to bring these rollers into this position is accomplished by an irregularly formed J shaped slide 67 guided by brackets 68 and 69 attached to the main frame F. Movement is communicated to this slide 67 by the resilient connection clearly shown in Figure 5. A spring 70 extends from a pin 71 fixed in the slide 67 to a pin 72 fixed in a control member 74 which is pivoted upon the pin 75. This pin 72 extends into an appropriate slot 73 in the slide 67, this opening being slightly enlarged to provide the necessary lost motion. Movement is given to the pivoted member 74 through a roller 76 which works in the cam slot 77 which is formed in the control disc 78 as shown in Figure 5.

When the shielding means 40 is moved out of shielding position, the above described resilient connection will be sufficient to move the frame 30 toward the sprocket 12, now exposed, so that the rollers 31 and 32 are effective to press the film thereagainst. The provision of such resilient support for the rollers 31 and 32, as they are being driven initially to position the film, also serves to protect the film from continued propulsion in case it does not feed properly through the threading channel.

The means for driving the rollers 31 and 32 in a feeding direction are shown in Figures 3 and 6. A gear 82 is mounted for rotation with the roller 31 and through a gear 83 communicates motion to a gear 84 mounted for motion with a roller 32 in a feeding direction. Mounted for rotation with the gear 82 is a driven clutch member 85 which is engaged by a driving surface 86 mounted upon a collar 87 in which is formed a clutch groove 88. A shaft 90 supports the collar 87 and is driven by a sprocket wheel 89. As is shown in Figure 2, motion is communicated to the sprocket wheel 89 by a chain 90' which passes over various guiding members 91 and is driven by a sprocket wheel 92.

Means for operating the previously described clutch for the rollers are well shown in Figure 2. A clutch fork 95 including a long extension is pivoted upon the bearing 96. A spring 97 normally forces the fork 95 toward the off position. A depending extension 98 is so disposed that a lower angled extension engages with an extension, bent toward said previously mentioned extension, and including a cam surface 99, formed on a member 100 which is pivoted upon a pin 101' fixed in the control slide 67. It will be readily seen, therefore, that movement of the control slide to the position shown in Figure 5 will be effective to move the fork 95 upon the pivot 96 against the power of the spring 97 so that the clutch is rendered operative. It will also be readily apparent that the clutch will be released upon the movement of the control member 100 downwardly. Such movement is accomplished by a link 101 which is held by a latch 102 shown in Figure 5 as pivoted upon the pin 103. Mounted upon the right hand portion of the member 102 is a sleeve 103' which includes a slot 104, the pin 105 projecting from the member 102 within the slot. A spring 106 tends to move the sleeve 103' to the right, as viewed in Figure 5. The utility of this construction will later be apparent.

The movement of the idlers 33, 34 and 35 which are associated with the sprockets 13, 14 and 15 respectively is accomplished in the same timing as is the movement of the picture gate section 110 and the sound gate section 111.

As is best shown in Figure 1 of the drawings, a movable section 110 of the picture gate is situated opposite a fixed section 112 and a movable section 111 of the sound gate is situated opposite a fixed section 113. Both of these gate sections have apertures as is conventional in the art. A source of light 114 cooperates with a condensing lens 115 to project a beam through the picture aperture and into the conventional objective lens 116. Similarly a light source 117 condensed by lens 118 projects a beam of light through the sound aperture and upon the photoelectric cell 119, the current thereof being amplified and led to a conventional loud speaker 120.

As is well-shown in Figure 10, idlers 33, 34 and 35 and movable gate sections 110 and 111 are all mounted upon a flat control member 123 which is guided in any appropriate manner as by brackets 124. An extension 126 of this member is operated by a roller 127 which is operated by a cam slot 128 in the control disc 129, the rotation of said disc thereby moving said three presser members and said two movable gate sections.

For securing the leading end of the film to the core 25 of the take-up carrier 24, we may use any suitable means, but for most purposes we prefer the so-called B or dash-pot type of take-up spindle guide which is shown and claimed in our previously mentioned co-pending application, Serial No. 352,525, filed April 4, 1929, now Patent Number 1,993,735, and in an application divisional therefrom, Serial No. 10,560, filed March 11, 1935.

This take-up guide may comprise a fixed guiding member 130 and a movable guiding member 131 mounted upon an arm 132 which is revoluble with a gear 133 which meshes with a gear 134 upon which an arm 135 is mounted which supports the second movable take-up guiding member 136. As is clearly shown by Figure 5, movement is communicated to the gear 134 by a gear 138 which in turn is moved by an arm 139 which is under the control of a pin 140. This pin works in a cam slot 141 formed in a plate 142 which is attached to and movable with a control rod 143. In the manner clearly taught by our co-pending application, to which reference has last previously been made, a spring 144 about the rod 143 mounted within a dash-pot 145 between the plunger 146 thereof and the top wall 147, gives motion downwardly, as read in the drawings, to this rod 143, such motion being controlled by the escape of the air through the adjustable port 148. It will therefore be readily understood that when the rod 143 is moved downwardly the take-up guiding members 131 and 136 will be separated, and when it is moved upwardly they will be brought together into the guiding position. To move this rod 143 upwardly against the power of the spring, a protuberance 150 is placed upon the rear of the control disc 78. A pivoted latch member 151 under the influence of a spring 152 is pivotally mounted upon the top of the rod 143, as viewed in these drawings. The latch 151 is disposed relatively further inwardly than the protuberance 150 so that while the protuberance picks up the latch upon the clockwise movement of the disc 78 and moves it upwardly to a point shortly below that shown in Figure 5, it thereupon slides to the left of the latch and at once permits the downward movement of the control rod 143. Movement of the disc 78 in the anti-clockwise direction causes the protuberance to depress the latch upon its pivotal point, without interference and without operating the rod 143.

From the previous portion of this description it has been evident that it is necessary to stop the drive of the feeding idlers 31 and 32 after the automatic preliminary positioning has been carried out. As is evident, this release must take place after the film has been automatically fed from the idlers to the take-up core and several layers of the film wrapped thereabout but before the separation of the guiding members 131 and 136. This release is secured by the downward movement of the latch 102. To give such downward movement a protuberance 160 is added to the control shaft 143 so that by the downward movement of the control shaft 143 as the take-up guides separate, the latch 102 is depressed and the clutch members 86 and 85 removed from driving and driven relation respectively. The sleeve 103 upon the latch 102 has previously been described as mounted for movement along the longitudinal axis of the latch. Consequently upon the upward movement of the rod 143 the sleeve 103' moves out of the way of the protuberance 160 and there is no interference therebetween.

In order to form the necessary unsupported loops of slack film and to assist in the preliminary positioning of the film in proper relation to the teeth of the sprockets, we provide combined loop-forming and guiding members. The first of these members consists of a member 165 mounted opposite the guiding member 46 and below the idlers supported by the frame 30 and above the movable picture gate section 110. This loop-forming member is movable between four positions—a first position as shown in Figure 2 in which it cooperates with the idlers above it and the gate section below it and the guiding member opposite it to form a portion of the path in which the film may be initially threaded by hand, a second position, shown in dotted line in Figure 5, in which this member and the gate section nearby are moved slightly inwardly and to the right as viewed in the figures, thus narrowing the channel through which the leading end of the film is initially and automatically propelled, a third position, shown in dotted lines in Figure 7 to the right of the film channel as viewed in the figure, the movement of the loop-forming member from said second to said third position obviously being operative to move the film laterally to its threading path and establish a loop therein, and a fourth position slightly to the right as shown in full lines in Figure 7, the movement of this member between said third and fourth positions being effective to give a very slight movement to the film to draw the appropriate perforations over the appropriate teeth of the sprocket. Figure 7, it will be noted, shows all four positions of this member. It will be seen that as the loop-forming member is moving from the second to the third positions the film is still shielded from the teeth of the sprocket. As a consequence the film is drawn over a smooth surface and no means must be supplied to cause any special or preliminary movement of the sprockets, thus avoiding complications and possible damage to the film.

It is of course understood that the loop-forming members must be removed from contact with the film so that the contraction and expansion of the loops during the running operation will not be interfered with thereby. Therefore the loop-forming members must be moved from the fourth position back to the first position before the feeding operation commences. When our apparatus is moved back from the projecting position into the feeding position or the rewinding position, the guiding member 46 will tend to press against the film at the upper loop and tend to flatten the loop. Such movement, however, will cause no difficulty because the member 46, as previously described, is resiliently mounted so that its pressure against the film will be slight and yielding. Similar results are obtained by the mounting of the second guide 57. This arrangement is likewise very useful in connection with the automatic preliminary positioning of the film. If any difficulty arises owing to a torn film, for example, and as a consequence the film does not feed directly through the feeding channel, relief may be afforded by the resilience of the members 46, 57 and 62.

Between the idlers 33 and 34 and opposite the guiding member 57 and hence below the intermittent sprocket 13, we provide a loop-forming and guiding member 166 which is operated similarly to the operation described above for the member 165, to form the lower or take-up loop. Opposite the guiding member 62 and below the idlers 35 we provide another positioning member 167 moving similarly to the loop-forming members 165 and 166. The function of the member 167, however, is to furnish temporarily a small amount of slack film between the third continuous sprocket 15 and the take-up carrier 24 of the film in relation to the teeth of the continuous members and to position the film in relation to the third continuous feeding member. This slack is of course immediately destroyed upon the backward (or left) movement of the positioning member 167 and the continued operation of the spindle 23.

Figure 7 of the drawings clearly shows the control mechanism for the three above described members. All of these members are mounted preferably resiliently (not shown) upon an irregularly shaped control and mounting plate 168. An extension 169 of this plate through the medium of the roller 170 mounted thereon works in the cam slot 171 of the control disc 172, the rotation of this control disc serving to move the members mounted thereupon between the first, second, third and fourth positions and back to the first position in the necessary relation to the operation of all of the other operable elements of the apparaus.

To complete the enclosed channel for the film, an additional gate member, extending the entire distance from the first continuous feeding member to the take-up guide is provided, this member being movable between one position in which it is disposed parallel to the other gate sections, thereby allowing access to the film, and another position, at right angles, to the previous position, wherein it encloses such opening and forms the fourth side of a channel in which the film may be threaded in the manner shown and claimed in the co-pending application Barton Allen Proctor, Serial Number 348,633, filed November 20, 1929, now Patent Number 1,944,037, as a continuation in part of his previously recited application, Serial Number 54,910, filed September 8, 1925, now Patent Number 1,894,963, and his application Serial Number 187,980, filed April 30, 1927, now Patent Number 1,944,033. In some of its aspects this gate member is shown and claimed in our co-pending application, Serial Number 352,525, filed April 4, 1929, now Patent Number 1,993,735.

For purposes of simplicity this gate member 173 is shown only in Figures 5 and 6. As will readily be seen from these figures, a plate 173 is hinged at 173' upon an axis adjacent the first and left portion of the gate channel, as viewed in the figures, and parallel thereto. A pin 174 and slot 175 connection in the plate 175' which is attached to the control member 67 is effective for operating this gate section through the cam slot 77 of the disc 78.

As has previously been stated, under certain conditions, we may operate our control mechanism by a powered movement of the various control discs, but in the preferred form which we are showing in this application we operate this control mechanism manually. Unless proper provision is made, it is possible that a careless operator, having moved the apparatus to the automatic threading position, that is, station 0, might continue its movement to the loop-forming and running positions, that is, station 1, before the film has had opportunity to be propelled to and about the core of the take-up carrier. To meet this possibility, we provide a lock, as is clearly shown in Figure 5 of the drawings. Pivoted upon a pin 176 is a latching member 177 which co-acts with a notch, as in the disc 78. It will readily be seen, therefore, that when the various discs have been moved into the station 0 position, the latching member and the notch will co-act to hold all of the discs in this position. This latch is controlled through a pin 178 mounted therein and a slot 179 cut in a plate 180 which is attached to the previously described operating rod 143. The cam formation of this slot, as will be seen in Figure 5, is effective for releasing the latch only after a sufficient downward travel of the rod 143 to give the film time to have become attached to the take-up core 25.

The means for driving the apparatus are shown partially diagrammatically in Figure 4 and Figure 12. A main driving shaft 201 is driven by a motor (not shown). Loosely mounted upon this shaft is the rewind pulley 202, which is operated by a feathered clutch member 203 operated by the clutch fork 204. The rewinding spindle 9, which is mounted for rotation with a pulley 206, is driven by a belt 205 from the pulley 202. Arms 207, 208 and 209 co-act with an appropriate cam surface cut upon the periphery of control disc 210 to operate the clutch yoke 204. A spring 211 tends to keep the arm 209 in contact with the disc 210.

Likewise pinned to the driving shaft 201 is a gear 215 which meshes with the gear 216 mounted for revolution with the sprocket wheel 92 which drives the chain 90' for the idlers 31 and 32 in the automatic positioning operation.

A clutch member 218 is feathered upon the shaft 201 to drive the take-up pulley 219 which revolves loosely upon this shaft. A belt 220 connects this pulley with the pulley 221 which drives the take-up shaft 23 upon which the take-up carrier 24 is mounted. Such drive is carried out through a yielding connection of any desired type shown conventionally as 222. The operation of this take-up clutch will later be described in connection with the operation of the main clutch.

A similar main clutch member 224 is likewise feathered to the drive shaft 201 for movement into relation with a driving gear 225 loosely mounted upon the shaft 201, this gear 225 meshing with the driving gear 226 which revolves the stub shaft 227 which through the mitre gears 228 and 229 drive the main vertical shaft 230. As is clearly shown in Figure 2 of the drawings, this shaft 230 through appropriate gearing 231 drives the third continuous sprocket 15, through gearing 232 drives the second continuous sprocket 14, through any desired type of intermittent mechanism 233, here shown conventionally, in Figure 10, drives the intermittent sprocket 13, and through gearing 234 drives the first continuous sprocket 12.

The means for controlling the previously described take-up clutch 218 and main clutch 224 are clearly shown in Figures 4, 7, 8, 9 and 12 of the drawings. To operate the main clutch 224, a yoke 240 is provided. This yoke is moved by a control member 241 guided by brackets 242' through an arm 242. A spring 243 tends to move this control member 241 upwardly into contact with a cam surface cut upon the periphery of the control disc 247.

The take-up clutch 218 is similarly controlled by a yoke 245 operated by a control member 246 which engages a cam surface upon the periphery of the disc 244 which is mounted coaxially with the disc 247 loosely on the shaft 268. Slight relative movement between the discs 244 and 247 is provided by a pin 248 and slot 249 connection. As will be readily understood by reference to Figures 8 and 9 this arrangement renders the take-up clutch operative before the main clutch is rendered operative upon the movement of the discs in a clockwise direction as viewed in Figure 7 and renders both of said clutches inoperative at the same time upon the movement of said discs in an anti-clockwise direction.

In order to render the projection light source 114 effective and ineffective upon the film at appropriate times, a shield 251 is provided therefor mounted upon the rotatable control rod 252 upon which also is mounted a shield 253 for rendering the light source for the photo-electric cell effective and ineffective thereupon. In order to operate these shields in the proper timed relation to the operation of all of the other operable elements of the apparatus as is clearly shown in Figure 7, a pin and slot connection, generically represented by 254, is provided. A rotatable control member 255 operates this rod 252, this rod in turn being rotated by the main clutch operating member 241, through a boss 256 upon the member 255, and an arm 257 extending from the boss and engaging a slot in the main clutch operating member 241.

A conventional shutter 261, cooperating with the picture aperture, is mounted for rotation upon a shaft 262 which is driven by a mitre gear 263 which is driven by a gear 264 upon the main vertical shaft 230, as is clearly shown in Figure 10, under the control of the clutch 224, as previously described.

A control shaft 268 upon which all of the control discs are mounted, as previously described, is attached to a dial 269, as shown in Figure 1, with appropriate indicia thereupon. A knob 270 is provided to move the dial and the entire control mechanism. It will of course be understood that upon the movement of this dial to station 1, the elements of the apparatus are disposed in the position shown in Figures 1 and 10, with all feeding members in operation and both the picture light source and the exciter lamp effective upon the film. Upon the movement of the dial to station 2, all feeding members are rendered inoperative, both light sources rendered inoperative, and the film contacting members disposed as shown in Figure 5, except that the take-up guides 131 and 136 remain open, since the anti-clockwise movement of the control mechanism is entirely ineffective upon the take-up guide control instrumentalities. Movement of the dial to station 3 through station 0 will dispose the film contacting parts in the position shown in Figure 2. At this point, the film may be manually removed from the apparatus or the dial may be moved to station 4, in which the film, assuming the trailing end to be in contact with the delivery carrier may be rewound. Thus the operation of one control mechanism, under the influence of the knob 270, operates all of the operable parts of this automatic apparatus.

If desired, the circuits for the motor and light circuits may also be controlled by the unitary control mechanism, as taught in our co-pending application to which reference has been made above, Serial Number 352,525, now Patent Number 1,993,735.

Certain of the advantages of our invention have been stated in the above portion of this specification. Other advantages include the provision of means whereby a sound film or other material may be automatically positioned and handled with no requirement whatever of skill or experience on the part of the operator and with no danger of injury to the material.

We claim:

1. In an apparatus for handling sound film, in combination, a revoluble film-supporting delivery carrier, a revoluble take-up carrier which includes a hub, film feeding means, operable means for forming an unimpeded channel through said apparatus from a point adjacent said delivery carrier to said take-up carrier, said channel-forming means including means for rendering the film inaccessible by said feeding means and operable means for securing the leading end of the film to the hub of said take-up carrier, means separate from said carriers and said feeding means for propelling the leading end of the film supported on said delivery carrier through said channel to said take-up carrier, means for destroying said channel, operable means for bringing the film into engagement with said film feeding means, movable members for producing loops of slack in the film adjacent said feeding means, means for first moving said loop forming members into engagement with the film and across the line of said film channel whereby loops are formed in the film and thereafter for moving said loop-forming members back across said channel and out of engagement with the loop so formed so that the expansion and contraction thereof during the projection of the film may be free from interference by said members, a first source of light for cooperation with the pictures upon said film, operable means for rendering said light effective and ineffective upon the film for projecting a picture therefrom, a second source of light for cooperation with sound symbols upon the film, means for rendering said second mentioned source of light effective and ineffective upon said sound symbols, means for rewinding the film upon said delivery carrier, and sequential control means operatively interconnecting all of said means for predeterminedly and selectively actuating each of said means.

2. In an apparatus for handling sound film, in combination, a revoluble delivery carrier, a revoluble take-up carrier, means for feeding a film from said delivery carrier toward said take-up carrier, an openable gate having a picture projection aperture and having a fixed section and a movable section, operable means for moving said movable gate section in relation to said fixed gate section, and openable gate having a sound projection aperture and having a fixed section and a movable section, operable guiding means for providing a channel from a point adjacent said delivery carrier through said gates past said feeding means to said take-up carrier, operable means for rendering the film in said channel inaccessible by said feeding means, operable means for propelling the leading end of the film supported on said delivery carrier through said channel to said take-up carrier, operable means for securing said leading end of the film to said take-up-carrier, operable means for bringing the film into operative engagement with said film moving means, members movable into engagement with the film and across the line of said film channel for forming loops in the film adjacent said feeding means, operable means for first moving said loop-forming members into engagement with the film and across said film channel whereby said loops are formed and for thereafter moving said loop-forming members back across said channel and free from engagement with the film whereby the expansion and contraction of the loops in the ordinary feeding operation is carried out without interference therefrom, sequential control mechanism interconnecting all of said means and said movable gate sections for actuating each of said means and for opening and closing said gates, a first light source for cooperation with the picture projection aperture of said first mentioned gate, means actuable by said control mechanism for rendering said light source effective and ineffective upon the film for projecting pictures therefrom, a second light source for cooperation with the sound projection aperture of said second gate, means actuable by said control mechanism for rendering said second light source effective and ineffective upon the film at said sound aperture for projecting images representing sound therefrom, means for removing said film securing means from the proximity of said take-up carrier so that the film may be further wound thereupon, and operable film rewinding means, said control mechanism including devices for opening said gates and operating said means for rendering the film inaccessible by said feeding means preparatory to operating said rewinding means and an operating connection between said control mechanism and said rewinding means for rendering said rewinding means operative and inoperative.

3. In a film handling apparatus, guiding means establishing a path in which a film is threaded, means engaging the film for feeding it after it has been threaded in said path, a means movable from a first position upon one side of said path into engagement with the film and across said path into a second position upon the opposite side thereof, such movement being effective for moving the film laterally to said path and producing a loop therein, means for moving said loop-producing means from said first to said second position and back to said first position, means for applying power to said feeding means, means for maintaining said loop-producing means in said first position while said power applying means is driving said feeding means, and interlocked control means for said power applying means and said means for moving said loop producing means.

4. In a film handling apparatus, a continuously driven delivery member, a continuously driven take-up member, operable means for intermittently feeding a film from said continuous delivery member toward said continuous take-up member, said means including an intermittent feeding member positioned between said continuous members and adapted to engage the film therebetween, means cooperating with said continuous and said intermittent members to form a path therebetween in which the film is threaded, a loop-forming member positioned between said intermittent member and each of said continuous members respectively and movable into engagement with the film and across said threading path so that the film is displaced from said path and loops formed therein, means for moving said loop-forming members into engagement with the film and across said path and thereafter moving them in a contrary direction and out of engagement with the film so that the loops so formed may contract and expand as the normal feeding operation is carried out without conflict with said loop-forming members, devices for maintaining said loop-forming members out of engagement with the film during such normal feeding operation, and sequential control mechanism operatively interconnecting said moving means and said intermittent feeding means and effective for first operating said moving means whereby said loop is formed and the loop-forming members withdrawn from relation with the film and thereafter rendering said intermittent feeding means operative upon the film.

5. In a motion picture apparatus, a continuously operating film moving member and an intermittently operating film moving member between which a film extends, guiding means establishing a path between said members in which a film may be threaded, a source of power, a clutch for applying power from said source to at least one of said film moving members, said clutch including a driving and a driven element one of which is movable into cooperative relation with the other for rendering said clutch operative, a loop-forming member engaging the film between said film moving members and movable from a first position wherein it is disposed upon one side of said threading path between said members to a second position wherein it is disposed upon the opposite side of said path, the movement of said member from said first to said second position being effective laterally to displace the film from said path and thereby form a loop therein, means for moving said film-engaging loop-producing member from said first to said second position and back to said first position, said moving means including devices for maintaining said loop-forming member in said first position, and control mechanism interconnecting said moving means and the movable element of said clutch for operating said moving means to maintain said loop-forming element in said first position while said driving and driven elements of said clutch are disposed in operative engagement.

6. In a motion picture apparatus, a continuously operating film moving member and an intermittently operating film moving member between which a film extends, guiding means establishing a path between said members in which a film may be threaded, a source of power, a clutch for applying power from said source to at least one of said film moving members, said clutch including a driving and a driven element one of which is movable into operative relation with the other for rendering said clutch operative, a loop-forming member engaging the film between said film moving members and movable from a first position wherein it is disposed upon one side of said threading path between said members to a second position wherein it is disposed upon the opposite side of said path, the movement of said member from said first to said second position being effective laterally to displace the film from said path and thereby produce a loop therein, means for moving said film-engaging loop-producing member between said positions, and control mechanism interconnecting said moving means and the movable element of said clutch for maintaining said clutch inoperative during the operation of said moving means and for operating said clutch after said moving means has moved said loop-producing member from said first to said second position and then back to said first position.

7. In a film handling apparatus, a delivery spindle and a take-up spindle, guiding means between said spindles for establishing a threading path for a film therebetween, means engaging the film for intermittently feeding the film after it has been threaded in said path, means for driving said take-up spindle, a member movable from a first position at one side of said path into engagement with the film and across said path to a second position whereby a loop is created in the film and thereafter movable in the opposite direction across said path to said first position wherein said loop-producing member is disposed out of contact with the film whereby the loop so formed may contract and expand without interference therefrom, means for moving said loop-producing member between said first and second positions, means for maintaining said loop-producing member in said second position during the operation of said intermittent feeding means, and sequential control mechanism interlocking said means for driving said take-up spindle and said means for moving said loop-producing member and effective for successively operating each of said means.

8. In a film handling apparatus, a delivery carrier and a take-up carrier, means disposed between said carriers for establishing a path for a film therebetween in which the film is threaded, two continuously operating members for feeding the film from said delivery carrier toward said take-up carrier, a member disposed between said continuous members for intermittently moving the film from one of said continuous members toward the other thereof, members disposed between said intermittent member and each of said continuous members respectively and movable from a first position at one side of said path into engagement with the film and across said path and into a second position upon the opposite side thereof, said movement being effective for creating loops in the film between said intermittent member and each of said continuous members respectively, means for moving said loop-producing members from said first positions to said second positions, thereby producing said loops, and thereafter moving said members from said second positions to said first positions, whereby the contraction and expansion of said loops in a normal feeding operation may be carried out without interference from said loop-producing members, means for maintaining said loop-producing members in said first position during the operation of said feeding members, means for driving said continuous members, and control mechanism interlocking said driving means and said moving means and effective for operating both of the same.

9. In a film handling apparatus having a threading path for a film therewithin, mechanism to support the film in said path, a member for feeding the film in relation to said supporting mechanism, operable means for actuating said film feeding member, means for initially positioning the film in operative relation with said film feeding member, mechanism for taking up the film fed by said feeding member, means for actuating said taking up mechanism, a member movable from a first position at one side of said path into engagement with the film and across said path to a second position upon the opposite side thereof thereby moving the film laterally in relation to said path and producing a loop therein, means for moving said loop-producing member from said first to said second position and back to said first position, devices for maintaining said loop-producing member in said first position during the operation of said feeding member and said take-up mechanism, and control mechanism interconnecting said actuating means, said film positioning means, and said means for moving said loop-producing member for controlling all of the same.

10. In a film handling apparatus, a continuously operating delivery member and a continuously operating take-up member between which a film extends, an operable intermittent film feeding mechanism disposed between said continuous members, an openable gate through which the film passes disposed between said continuous members, operable means to move the film into operative engagement with said feeding mechanism, means cooperating with said previously recited parts to form a path in which the film may be threaded, a member engaging the film between said intermittent feeding mechanism and each of said continuous members respectively and movable across said path between said continuous members in order to form a loop of slack in the film between each of said members and said intermittent feeding mechanism, means for first moving said loop-forming film-engaging members across said path whereby said loops are formed and thereafter moving said loop-forming film-engaging members in the opposite direction and out of contact with the film whereby the loop so formed may contract and expand without interference from said loop-forming members, devices for maintaining said loop-forming members in said last previously mentioned position during the operation of said intermittent feeding mechanism, and interlocked control means operatively interconnecting said feeding mechanism, said gate, said film moving means and said means for moving said loop forming members and effective to operate all of the same.

11. In a film handling apparatus, a continuously operating delivery member and a continuously operating take-up member between which a film extends, an operable intermittent film feeding mechanism disposed between said continuous members, operable means to move the film into operative engagement with said feeding mechanism, means cooperating with said previously recited parts to form a path in which the film may be threaded, a member engaging the film between said intermittent feeding mechanism and said continuous members respectively and movable across said path between said continuous members in order to form a loop of slack in the film between each of said members and said intermittent feeding mechanism, means for first moving said loop-forming film-engaging members across said path whereby said loops are formed and thereafter moving said loop-forming film-engaging members in the opposite direction and out of contact with the film whereby the loops so formed may contract and expand without interference from said loop-forming members, devices for maintaining said loop-forming members in said last previously mentioned position during the operation of said intermittent feeding mechanism, and interlocked control means operatively interconnecting said feeding mechanism, said film moving means and said means for moving said loop forming members and effective to operate all of the same.

12. In a film handling apparatus, a continuously operating delivery member and a continuously operating take-up member between which a film extends, an operable intermittent film feeding mechanism disposed between said continuous members, an openable gate through which the film passes disposed between said continuous members, means cooperating with said previously recited parts to form a path in which the film may be threaded, a member engaging the film between said intermittent feeding mechanism and said continuous members respectively and movable across said line of travel between said continuous members in order to form a loop of slack in the film between each of said members and said intermittent feeding mechanism, means for first moving said loop forming film engaging members across said path whereby said loops are formed and thereafter moving said loop-forming film-engaging members in the opposite direction and out of contact with the film whereby the loops so formed may contract and expand without interference from said loop-forming members, devices for maintaining said loop-forming members in said last previously mentioned position during the operation of said intermittent feeding mechanism, and interlocked control means operatively interconnecting said feeding mechanism, said gate, and said means for moving said loop-forming members and effective to operate all of the same.

13. In a film handling apparatus, a continuously driven delivery carrier, a continuously driven take-up carrier, a gate structure disposed therebetween, said gate structure comprising complementary members defining therebetween a path in which a film may be initially threaded, means for intermittently feeding the film from said delivery carrier toward said take-up carrier after the film has been threaded in said path, said feeding means extending into said path for feeding the film therealong, a loop-producing member engaging the film between said intermittent feeding means and each of said continuous members respectively and movable between first positions upon one side of said threading path into engagement with the film and across said path to positions upon the opposite side thereof, such movement from said first positions to said second positions being effective to produce loops in the film between each of said continuous members and said intermittent means to compensate for the difference in character of movement of said continuous members and said intermittent feeding means during the operation of the same, means for moving said loop-producing members from said first positions to said second positions and back to said first positions, such movement to said first positions being effective to remove said members from contact with the film whereby the ordinary feeding operation may be carried out without interference therefrom, means for maintaining said loop-producing members in said first positions during the feeding of the film by said intermittent feeding means, and operable means for preventing said feeding means from operatively engaging the film during the threading operation.

14. In a film handling apparatus, two continuously operating film supporting members between which a film extends, guides establishing a path between said members in which the film may be initially threaded, mechanism for intermittently feeding the film from one of said members toward the other, said intermittent mechanism including a feeding member engaging the film between said continuous members, means for rendering said feeding mechanism operative and inoperative upon the film for regularly intermittently advancing the film, a loop-forming member engaging the film between said intermittent feeding member and each of said continuous members respectively and movable from first positions upon one side of said path in which the film is threaded into engagement with the film and across said path to second positions upon the opposite side thereof, such movement being effective to form loops in the film between said intermittent feeding member and each of said continuous members respectively, means for moving said film-engaging members from said first positions to said second positions and back to said first positions, such reverse movement of said loop-forming members to said first positions being effective to remove said loop-forming members from contact with the film thereby permitting the regular intermittent film feeding operation to be carried out without interference therefrom, devices for maintaining said loop-forming members in said first positions during the regular intermittent feeding operation, and sequential control means interlocking both of said means and effective for operating each of the same in successive relation.

15. In a film handling apparatus, two film supports, means for intermittently feeding a film from one of said supports toward the other thereof, said means including a toothed member positioned between said carriers and adapted to engage the film, means for separating the film and said toothed member whereby said toothed member and the film are maintained free of engagement, means engaging the film between said intermittent toothed member and each of said supports respectively and movable between first positions wherein they define one side of a relatively short path between said supports and second positions wherein they define one side of a relatively long path between said supports, means for moving said film-engaging path-defining means from said first positions to the second thereof and from the second thereof to the first thereof, such movement of said film-engaging means from said first positions to said second positions being effective to create a loop in the film and such movement of said means from said second to said first positions being effective to remove said means from within the loop so created so that upon the regular projection operation of the film there is no interference between the film and said means as the loop contracts and expands, means for maintaining said film-engaging means in said first positions during the regular projection operation, and sequential control mechanism interconnecting said means for separating the film and said means for moving said film-engaging path-defining means and including instrumentalities which are effective first to operate said moving means to move said film-engaging path-defining means from said first to said second positions and back again to said first positions while maintaining said separating means effective and thereafter to render said separating means ineffective.

16. In a film handling apparatus, guiding means establishing a path in said apparatus in which a film is initially threaded, an intermittently operated toothed feeding member disposed adjacent said path, a shielding member movable from and to a position wherein it establishes a portion of said threading path and is disposed between the teeth of said feeding member and the film thereby shielding the film from said teeth, a film-engaging loop-forming member movable from a first position upon one side of said path across said path to a second position upon the opposite side thereof whereby the film is laterally displaced from said path and a loop is formed therein, and means for maintaining said shielding member in shielding relation to said intermittent feeding member until said loop-forming member is disposed in said second position whereby the film necessary for said loop is drawn over said shielding member without contact with the teeth of said feeding member.

17. In a film handling apparatus, guiding means establishing a path in said apparatus in which a film is initially threaded, an intermittently operated toothed feeding member disposed adjacent said path, a shielding member movable from and to a position wherein it establishes a portion of one side of said threading path and is disposed between the teeth of said feeding member and the film thereby shielding the film from said teeth, a film-engaging loop-forming member movable from a first position wherein it forms a portion of the side of said path opposite that side a portion of which is formed by said shielding member and a second position across said path whereby the film is laterally displaced from said path and a loop is formed therein, and control mechanism interlocking said shielding member and said loop-forming member for operating both of the same, said control mechanism including devices for maintaining said shielding member in shielding position until said loop-forming member has been moved from said first to said second position and back to said first position and for thereupon removing said shielding member from shielding position.

18. In an apparatus for handling sound films, a sound gate, a picture gate, said gates being operable and so disposed as to engage the same film, means for opening and closing said gates, means for feeding a film through said gates, a source of light for said picture gate, means for rendering said source of light effective and ineffective upon the film, an exciter lamp for said sound gate, means for rendering said exciter lamp effective and ineffective upon the film, and control mechanism interconnecting all of said means and effective for operating each of the same.

19. In an apparatus for handling sound films, in combination, a revoluble film-supporting delivery carrier, a revoluble take-up carrier which includes a hub, film feeding means, operable means for forming an unimpeded channel through said apparatus from a point adjacent said delivery carrier to said take-up carrier, said channel-forming means including means for rendering the film inaccessible by said feeding means and operable means for securing the leading end of the film to the hub of said take-up carrier, means separate from said carriers and said feeding means for propelling the leading end of the film supported on said delivery carrier through said channel to said take-up carrier, means for destroying said channel, operable means for bringing the film into engagement with said film feeding means, movable members for producing loops of slack in the film adjacent said feeding means, means for first moving said loop-forming members into engagement with the film and across the line of said film channel whereby loops are formed in the film and thereafter for moving said loop-forming members back across said channel and out of engagement with the loops so formed so that the expansion and contraction thereof during the projection of the film may be free from interference by said members, a first source of light for cooperation with the pictures upon said film, operable means for rendering said light effective and ineffective upon the film for projecting pictures therefrom, a second source of light for cooperation with sound symbols upon the film, means for rendering said second mentioned source of light effective and ineffective upon said sound symbols, and means operative alternatively to the operation of said film feeding means for rewinding the film upon said delivery carrier.

20. In an apparatus for handling sound films, in combination, a revoluble film-supporting delivery carrier, a revoluble take-up carrier which includes a hub, film feeding means including an intermittently operating film advancing member, operable means for forming an unimpeded channel through said apparatus from a point adjacent said delivery carrier to said take-up carrier, said channel-forming means including means for rendering the film inaccessible by said feeding means and operable means for securing the leading end of the film to the hub of said take-up carrier, means for propelling the leading end of the film supported on said delivery carrier through said channel to said take-up carrier, means for destroying said channel, operable means for bringing the film into engagement with said film feeding means, means for producing loops of slack in the film adjacent said intermittent film advancing member, a first source of light for cooperation with the pictures upon said film, operable means for rendering said light effective and ineffective upon the film for projecting pictures therefrom, a second source of light for cooperation with sound symbols upon the film, means for rendering said second mentioned source of light effective and ineffective upon said sound symbols, and means for rewinding the film upon said delivery carrier.

21. In an apparatus for handling sound films, in combination, a revoluble film-supporting delivery carrier, a revoluble take-up carrier, film feeding means including an intermittently operating film advancing member, operable means for forming an unimpeded channel through said apparatus from a point adjacent said delivery carrier to said take-up carrier, said channel-forming means including means for rendering the film inaccessible by said feeding means, means for propelling the leading end of the film supported on said delivery carrier through said channel to said take-up carrier, means for destroying said channel, operable means for bringing the film into engagement with said film feeding means, means for producing loops of slack in the film adjacent said intermittent film advancing member, a first source of light for cooperation with the pictures upon said film, operable means for rendering said light effective and ineffective upon the film for projecting a picture therefrom, a second source of light for cooperation with sound symbols upon the film, means for rendering said second mentioned source of light effective and ineffective upon said sound symbols, and means for rewinding the film upon said delivery carrier.

22. In an apparatus for handling sound films, in combination, a revoluble film-supporting delivery carrier, a revoluble take-up carrier which includes a hub, film feeding means including an intermittently operating film advancing member, operable means for forming an unimpeded channel through said apparatus from a point adjacent said delivery carrier to said take-up carrier, said channel-forming means including means for rendering the film inaccessible by said feeding means and operable means for securing the leading end of the film to the hub of said take-up carrier, means for propelling the leading end of the film supported on said delivery carrier through said channel to said take-up carrier, means for destroying said channel, operable means for bringing the film into engagement with said film feeding means, means for producing loops of slack in the film adjacent said intermittent film advancing member, a first source of light for cooperation with the pictures upon said film, operable means for rendering said light effective and ineffective upon the film for projecting a picture therefrom, a second source of light for cooperation with sound symbols upon the film, means for rendering said second mentioned source of light effective and ineffective upon said sound symbols, means for rewinding the film upon said delivery carrier, and sequential control means operatively interconnecting all of said means for predeterminedly and selectively actuating each of said means.

23. In an apparatus for handling sound films, in combination, a revoluble film-supporting delivery carrier, a revoluble take-up carrier, film feeding means including an intermittently operating film advancing member, operable means for forming an unimpeded channel through said apparatus from a point adjacent said delivery carrier to said take-up carrier, said channel-forming means including means for rendering the film inaccessible by said feeding means, means for propelling the leading end of the film supported on said delivery carrier through said channel to said take-up carrier, means for destroying said channel, operable means for bringing the film into engagement with said film feeding means, means for producing loops of slack in the film adjacent said intermittent film advancing member, a first source of light for cooperation with the pictures upon said film, operable means for rendering said light effective and ineffective upon the film for projecting a picture therefrom, a second source of light for cooperation with sound symbols upon the film, means for rendering said second mentioned source of light effective and ineffective upon said sound symbols, means for rewinding the film upon said delivery carrier, and sequential control means operatively interconnecting all of said means for predeterminedly and selectively actuating each of said means.

24. In an apparatus for handling a film having thereupon pictorial images and images representing sound, a first means for moving said film in a projecting direction, means for projecting pictures from said pictorial images during such projecting movement, means for reproducing sound from said sound images during such projecting movement, a second and alternatively operative means for moving the film in the opposite direction for rewinding the film, and means operatively interconnected with said rewinding means for rendering said sound reproducing means inoperative during said rewinding operation.

25. In an apparatus for handling a film having thereupon pictorial images and images representing sound, a first means for moving said film in one direction for the purposes of projecting pictures from said pictorial images and reproducing sound from said sound images, a second and alternatively operable means for moving said film in the other direction for the purpose of rewinding said film, a source for passing light through said sound images, a photo-electric cell so positioned as to receive light from said source after it has passed through said sound images upon said film, sound reproducing means operated by said photo-electric cell under the influence of light which has passed through said sound images, automatically operative means for preventing light from said source from reaching said cell while the film is being moved in said rewinding direction by said second means whereby said cell receives no light from said sound images and said sound reproducing means is thereby rendered inoperative, and automatically operative means for rendering said light preventing means inoperative while the film is being moved in said projecting direction by said second means whereby said cell receives light from said sound images and said sound reproducing means is thereby rendered operative.

26. In a sound film apparatus, a first means for moving a film in a projecting direction, a second means for moving a film in the opposite or rewinding direction, a first control means for rendering said first and second moving means alternatively operative, means for reproducing sound in synchronism with the movement of the film in said projecting direction, a second control means for said sound reproducing means, and an operating connection between said first and second control means for operating each of said control means in predetermined relation to the operation of the other thereof.

27. In an apparatus for handling a film having thereupon pictorial images and images representing sound, a first means for moving said film in one direction for the purposes of projecting pictures from said pictorial images and reproducing sound from said sound images, a second means for moving said film in the other direction for rewinding said film, control means for rendering said first and second means alternatively operative, a source for passing light through said sound images, a photo-electric cell so positioned as to receive light from said source after it has passed through said sound images, sound reproducing means operated by said cell, means for preventing light from said source reaching said cell, and an operating connection between said control means and said light preventing means for operating said light preventing means in cooperation with the operation of said control means.

28. In an apparatus for handling a film having thereupon pictorial images and images representing sound, a first means for moving said film in one direction, a second means for moving said film in the other direction, actuating means for rendering said first and second means alternatively operative, a source for passing light through said sound images, a photo-electric cell so positioned as to receive light from said source after it has passed said sound images, means operated by said cell for reproducing the sound represented by said sound images, means for controlling the operation of said sound reproducing means, and an operating connection between said actuating means and said sound controlling means for operating said sound controlling means in cooperation with the operation of said actuating means.

29. In an apparatus for handling sound films, in combination, a revoluble film-supporting delivery carrier, a revoluble take-up carrier which includes a hub, film feeding means, operable means for forming an unimpeded channel through said apparatus from a point adjacent said delivery carrier to said take-up carrier, said channel-forming means including means for rendering the film inaccessible by said feeding means and operable means for securing the leading end of the film to the hub of said take-up carrier, means separate from said carriers and said feeding means for propelling the leading end of the film supported on said delivery carrier through said channel to said take-up carrier, means for destroying said channel, operable means for bringing the film into engagement with said film feeding means, movable members for producing loops of slack in the film adjacent said feeding means, means for first moving said loop-forming members into engagement with the film and across the line of said film channel whereby loops are formed in the film and thereafter for moving said loop-forming members back across said channel and out of engagement with the loop so formed so that the expansion and contraction thereof during the projection of the film may be free from interference by said members, a first source of light for cooperation with the pictures upon said film, operable means for rendering said light effective and ineffective upon the film for projecting a picture therefrom, a second source of light for cooperation with sound symbols upon the film, and means for rendering said second mentioned source of light effective and ineffective upon said sound symbols.

30. In an apparatus for handling sound films, in combination, a revoluble film-supporting delivery carrier, a revoluble take-up carrier which includes a hub, film feeding means, operable means for forming an unimpeded channel through said apparatus from a point adjacent said delivery carrier to said take-up carrier, said channel-forming means including means for rendering the film inaccessible by said feeding means and operable means for securing the leading end of the film to the hub of said take-up carrier, means separate from said carriers and said feeding means for propelling the leading end of the film supported on said delivery carrier through said channel to said take-up carrier, means for destroying said channel, operable means for bringing the film into engagement with said film feeding means, movable members for producing loops of slack in the film adjacent said feeding means, means for first moving said loop-forming members into engagement with the film and across the line of said film channel whereby loops are formed in the film and thereafter for moving said loop-forming members back across said channel and out of engagement with the loop so formed so that the expansion and contraction thereof during the projection of the film may be free from interference by said members, a first source of light for cooperation with the pictures upon said film, operable means for rendering said light effective and ineffective upon the film for projecting a picture therefrom, a second source of light for cooperation with sound symbols upon the film, means for rendering said second mentioned source of light effective and ineffective upon said sound symbols, and sequential control means operatively interconnecting all of said means for predeterminedly and selectively actuating each of said means.

31. In an apparatus for handling sound films, in combination, a revoluble film-supporting delivery carrier, a revoluble take-up carrier, film feeding means, operable means for forming an unimpeded channel through said apparatus from a point adjacent said delivery carrier to said take-up carrier, said channel-forming means including means for rendering the film inaccessible by said feeding means, means separate from said carriers and said feeding means for propelling the leading end of the film supported on said delivery carrier through said channel to said take-up carrier, means for destroying said channel, operable means for bringing the film into engagement with said film feeding means, movable members for producing loops of slack in the film adjacent said feeding means, means for first moving said loop-forming members into engagement with the film and across the line of said film channel whereby loops are formed in the film and thereafter for moving said loop-forming members back across said channel and out of engagement with the loops so formed so that the expansion and contraction thereof during the projection of the film may be free from interference by said members, a first source of light for cooperation with the pictures upon said film, operable means for rendering said light effective and ineffective upon the film for projecting pictures therefrom, a second source of light for cooperation with sound symbols upon the film, and means for rendering said second mentioned source of light effective and ineffective upon said sound symbols.

32. In an apparatus for handling sound films, in combination, a revoluble film-supporting delivery carrier, a revoluble take-up carrier, film feeding means, operable means for forming an unimpeded channel through said apparatus from a point adjacent said delivery carrier to said take-up carrier, said channel-forming means including means for rendering the film inaccessible by said feeding means, means separate from said carriers and said feeding means for propelling the leading end of the film supported on said delivery carrier through said channel to said take-up carrier, means for destroying said channel, operable means for bringing the film into engagement with said film feeding means, movable members for producing loops of slack in the film adjacent said feeding means, means for first moving said loop-forming members into engagement with the film and across the line of said film channel whereby loops are formed in the film and thereafter for moving said loop-forming members back across said channel and out of engagement with the loops so formed so that the expansion and contraction thereof during the projection of the film may be free from interference by said members, a first source of light for cooperation with the pictures upon said film, operable means for rendering said light effective and ineffective upon the film for projecting pictures therefrom, a second source of light for cooperation with sound symbols upon the film, means for rendering said second mentioned source of light effective and ineffective upon said sound symbols, and sequential control means operatively interconnecting all of said means for predeterminedly and selectively actuating each of said means.

33. In an apparatus for handling sound films, in combination, film feeding mechanism, operable means for rendering said film feeding mechanism effective to move the film, movable members for producing loops of slack in the film adjacent said feeding mechanism, means for first moving said loop-forming members into engagement with the film and across the line of said film channel whereby loops are formed in the film and thereafter for moving said loop-forming members back across said channel and out of engagement with the loops so formed so that the expansion and contraction thereof during the projection of the film may be free from interference by said members, a first source of light for cooperation with the pictures upon said film, operable means for rendering said light effective and ineffective upon the film for projecting pictures therefrom, a second source of light for cooperation with sound symbols upon the film, means for rendering said second mentioned source of light effective and ineffective upon said sound symbols, and sequential control means operatively interconnecting all of said means for predeterminedly and selectively actuating each of said means.

34. In an apparatus for handling sound films, in combination, film feeding mechanism, operable means for rendering said film feeding mechanism effective to move the film, movable members for producing loops of slack in the film adjacent said feeding mechanism, means for first moving said loop-forming members into engagement with the film and across the line of the film channel for forming loops in the film and thereafter for moving said loop-forming members back across said channel and out of engagement with the loops so formed so that the expansion and contraction thereof during the projection of the film may be free from interference by said members, means for maintaining said loop forming members in said last mentioned position during the projection of the film, a first source of light for cooperation with the pictures upon said film during the feeding thereof by said feeding mechanism, operable means for rendering said light effective and ineffective upon the film for projecting pictures therefrom, a second source of light for cooperation with sound symbols upon the film during the feeding thereof by said feeding mechanism, and means for rendering said second mentioned source of light effective and ineffective upon said sound symbols.

35. In an apparatus for handling sound films, in combination, film feeding mechanism, operable means for bringing the film into engagement with said film feeding mechanism, movable members for producing loops of slack in the film adjacent said feeding mechanism, means for first moving said loop-forming members into engagement with the film and across the line of the film channel for forming loops in the film and thereafter for moving said loop-forming members back across said channel and out of engagement with the loops so formed so that the expansion and contraction thereof during the projection of the film may be free from interference by said members, mechanism for maintaining said loop-forming members in said second mentioned position during the projection of the film, a source of light for cooperation with sound symbols upon the film, means for rendering said source of light effective upon said sound symbols, and control means operatively interconnecting all of said means for actuating each of said means.

36. In an apparatus for handling sound films, in combination, a revoluble film-supporting delivery carrier, a revoluble take-up carrier which includes a hub, film feeding mechanism, operable means for forming an unimpeded channel through said apparatus from a point adjacent said delivery carrier to said take-up carrier, said channel-forming means including means for rendering the film inaccessible by said film feeding mechanism and operable means for securing the leading end of the film to the hub of said take-up carrier, means separate from said carriers and said feeding mechanism for propelling the leading end of the film supported on said delivery carrier through said channel to said take-up carrier, means for destroying said channel, operable means for rendering said film feeding mechanism effective to move the film, movable members for producing loops of slack in the film adjacent said feeding mechanism, means for first moving said loop forming members into engagement with the film and across the line of said film channel whereby loops are formed in the film and thereafter for moving said loop-forming members back across said channel and out of engagement with the loops so formed so that the expansion and contraction thereof during the projection of the film may be free from interference by said members, a first source of light for cooperation with the pictures upon said film, operable means for rendering said light effective and ineffective upon the film for projecting pictures therefrom, a second source of light for cooperation with sound symbols upon the film, means for rendering said second mentioned source of light effective and ineffective upon said sound symbols, means for rewinding the film upon said delivery carrier, and sequential control means operatively interconnecting all of said means for predeterminedly and selectively actuating each of said means.

37. In an apparatus for handling sound films, in combination, a revoluble film-supporting delivery carrier, a revoluble take-up carrier which includes a hub, film feeding mechanism, operable means for forming an unimpeded channel through said apparatus from a point adjacent said delivery carrier to said take-up carrier, said channel-forming means including means for rendering the film inaccessible by said feeding mechanism and operable means for securing the leading end of the film to the hub of said take-up carrier, means separate from said carriers and said feeding mechanism for propelling the leading end of the film supported on said delivery carrier through said channel to said take-up carrier, means for destroying said channel, operable means for rendering said film feeding mechanism effective to feed the film, movable members for producing loops of slack in the film adjacent said feeding mechanism, means for first moving said loop forming members into engagement with the film and across the line of said film channel whereby loops are formed in the film and thereafter for moving said loop-forming members back across said channel and out of engagement with the loops so formed so that the expansion and contraction thereof during the projection of the film may be free from interference by said members, a first source of light for cooperation with the pictures upon said film, operable means for rendering said light effective and ineffective upon the film for projecting pictures therefrom, a second source of light for cooperation with sound symbols upon the film, means for rendering said second mentioned source of light effective and ineffective upon said sound symbols, and means for rewinding the film upon said delivery carrier.

38. In an apparatus for handling sound films, in combination, a revoluble film-supporting delivery carrier, a revoluble take-up carrier which includes a hub, a film feeding mechanism, operable means for forming an unimpeded channel through said apparatus from a point adjacent said delivery carrier to said take-up carrier, said channel-forming means including means for rendering the film inaccessible by said feeding mechanism and operable means for securing the leading end of the film to the hub of said take-up carrier, means separate from said carriers and said feeding mechanism for propelling the leading end of the film supported on said delivery carrier through said channel to said take-up carrier, means for destroying said channel, operable means for rendering said film feeding mechanism effective to feed the film, movable members for producing loops of slack in the film adjacent said feeding mechanism, means for first moving said loop forming members into engagement with the film and across the line of said film channel whereby loops are formed in the film and thereafter for moving said loop-forming members back across said channel and out of engagement with the loops so formed so that the expansion and contraction thereof during the projection of the film may be free from interference by said members, a first source of light for cooperation with the pictures upon said film, operable means for rendering said light effective and ineffective upon the film for projecting pictures therefrom, a second source of light for cooperation with sound symbols upon the film, and means for rendering said second mentioned source of light effective and ineffective upon said sound symbols.

39. In a film handling apparatus, in combination, projecting mechanism and an auxiliary threading mechanism, said projecting mechanism including a delivery member, a take-up member, and toothed feeding means disposed intermediate said delivery member and said take-up member for carrying out the regular feeding operation, and said auxiliary threading mechanism comprising means for forming an unimpeded channel extending from said delivery member to said take-up member clear of interference from the teeth of said feeding means and means, separate from said projecting mechanism, for propelling the free end of a film supported upon said delivery member through said channel toward said take-up member for the purpose of placing the film in operative position preliminary to the operation of the projecting mechanism.

40. In a film handling apparatus, in combination, projecting mechanism and an auxiliary threading mechanism, said projecting mechanism including a delivery member, a take-up member, and toothed feeding means disposed intermediate said delivery member and said take-up member for carrying out the regular feeding operation, and said auxiliary threading mechanism comprising means for forming an unimpeded threading channel extending from said delivery member to said take-up member clear of interference from the teeth of said feeding means and means for propelling the free end of a film supported upon said delivery member through said channel toward said take-up member for the purpose of placing the film in operative position preliminary to the operation of the projecting mechanism, said propelling means including a smooth roller bearing against the film adjacent the entrance to said threading channel, means upon the side of the film opposite that upon which said smooth roller bears for maintaining pressure between the film and said roller, and means for applying power to said roller whereby said roller propels the film through said channel.

41. In a film handling apparatus, in combination, projecting mechanism and an auxiliary threading mechanism, said projecting mechanism including a delivery member, a take-up member, and toothed feeding means disposed intermediate said delivery member and said take-up member for carrying out the regular feeding operation, and said auxiliary threading mechanism comprising means for forming an unimpeded channel extending from said delivery member to said take-up member clear of interference from the teeth of said feeding means, said channel forming means including a shield movable to a position between the film and said toothed feeding means and means for moving said shield to said position, and means for propelling the free end of a film supported upon said delivery member through said channel toward said take-up member for the purpose of placing the film in operative position preliminary to the operation of the projecting mechanism, said propelling means including a smooth roller bearing against the film opposite said shield when said shield is disposed in shielding position and means to revolve said roller whereby the film is propelled.

42. In a film handling apparatus, in combination, projecting mechanism comprising a delivery carrier by which a film is supported, a take-up carrier, and a toothed feeding member disposed intermediate said carriers for carrying out the regular feeding operation upon said film, and auxiliary threading mechanism which comprises means for forming an unimpeded channel extending between said delivery carrier and said take-up carrier clear of interference from the teeth of said feeding member, means, separate from said projecting mechanism, for propelling the free end of said film supported upon said delivery carrier through said channel toward said take-up carrier, and means for destroying said channel and rendering said propelling means ineffective upon the film.

43. In a film handling apparatus, in combination, projecting mechanism comprising a delivery carrier by which a film is supported, a take-up carrier, and a toothed feeding member disposed between said carriers for carrying out the regular feeding operation upon said film, and auxiliary threading mechanism which comprises means for forming an unimpeded channel extending between said delivery carrier and said take-up carrier clear of interference from the teeth of said feeding member, means, separate from said projecting mechanism, for propelling the free end of said film supported by said delivery carrier through said channel toward said take-up carrier, means for destroying said channel, means for rendering said propelling means ineffective upon the film, and control means operatively interconnecting said channel-destroying means and said means for rendering said propelling means ineffective upon the film for operating one of the same in cooperation with the operation of the other thereof.

44. In a film handling apparatus, in combination, projecting mechanism comprising a delivery carrier by which a film is supported, a take-up carrier, and a toothed feeding member disposed between said carriers for carrying out the regular feeding operation upon said film, and auxiliary threading mechanism which comprises means for forming an unimpeded channel extending between said delivery carrier and said take-up carrier clear of interference from the teeth of said feeding member, means, separate from said projecting mechanism, for propelling the free end of said film supported by said delivery carrier through said channel toward said take-up carrier, means for destroying said channel, means for rendering said propelling means ineffective upon the film, and control means operatively interconnecting said means for creating said channel, said means for destroying said channel, and said means for rendering said propelling means ineffective upon the film for operating all of the same in cooperation one with the other.

45. In a film handling apparatus, in combination, projecting mechanism comprising a delivery carrier by which a film is supported, a take-up carrier, and a toothed feeding member disposed between said carriers for carrying out the regular feeding operation upon said film, and auxiliary threading mechanism which comprises operable means for forming an unimpeded channel extending between said delivery carrier and said take-up carrier clear of interference from the teeth of said feeding member, means for operating said channel forming means, means, separate from said projecting mechanism, for propelling the free end of said film supported by said delivery carrier through said channel toward said take-up carrier, means for controlling the operation of said propelling means upon the film, and control means operatively interconnecting said means for controlling said propelling means and said means for operating said channel forming means for operating each of the same in cooperation with the operation of the other thereof.

46. In a film handling apparatus, a delivery carrier by which a film is supported and a take-up carrier, means for feeding said film from said delivery carrier toward said take-up carrier to carry out the regular film feeding operation upon said film, and alternatively operable auxiliary threading means for propelling the free end of said film supported by said delivery carrier toward said take-up carrier for threading the film in said apparatus preparatory to such regular film feeding operation upon said film, each of said means comprising film engaging feeding members separate and distinct from those of the other.

47. In a film handling apparatus, a delivery carrier by which a perforated film is supported and a take-up carrier, means including a toothed revoluble member engaging the perforations of said film for feeding said film from said delivery carrier toward said take-up carrier to carry out the regular film feeding operation upon said film, and alternatively operable auxiliary threading means including a member engaging the surface of said film by frictional contact for moving said film supported by said delivery carrier toward said take-up carrier for threading the film in said apparatus preparatory to such regular film feeding operation upon said film, and means for operating said frictional member.

48. In a film handling apparatus having a delivery carrier and a take-up carrier and toothed means for feeding a film from said delivery carrier toward said take-up carrier, threading mechanism which comprises means providing a clear channel for the film between said carriers, a smooth roller frictionally engaging the film supported by said delivery carrier, means for revolving said roller, and means for holding the film in position to be operatively engaged by said smooth roller whereby revolution of said roller is effective to propel the free end of the film through said channel.

49. In a film handling apparatus, an intermittent feeding member, a toothed member for feeding a perforated film in relation thereto by coaction between the teeth of said member and the perforations of the film, a pressure roller for holding the film against said teeth to assist in such film feeding operation, a shield movable to a position between the teeth of said member and said pressure roller, said roller and said feeding member being movable one relatively to the other to permit said shield to pass between them, and means for driving said pressure roller so that it feeds the film in relation to said intermittent member by engagement with a surface of the film alternatively to the feeding of the film by said toothed member.

50. In a film handling apparatus, in combination, a toothed sprocket, a displacably mounted revoluble member for pressing a film against said sprocket, an arcuate shielding member coaxial with said sprocket and movable circumferentially about the same to a position between said sprocket and said revoluble member wherein said shielding member and said revoluble member engages the film therebetween, said roller and said feeding member being movable one relatively to the other to permit said shield to pass between them, and means for moving said shielding member.

51. In an apparatus for handling sound film having means for feeding a film intermittently for projecting pictures therefrom and means for feeding the same film continuously for reproducing sound therefrom, threading mechanism which includes operable means for initially producing loops of slack film for cooperation with said intermittent feeding means, means for operating said loop producing means, means for initially rendering said continuous feeding means operative upon the film, and interlocked actuating means for said means for operating said loop-producing means and said means for initially rendering said continuous feeding means operative upon the film.

52. In an apparatus for handling a film having thereupon pictorial images and images representing sound, means for intermittently feeding the film for projecting pictures from said pictorial images, means for feeding the film continuously for producing sound from said sound images in synchronism with said intermittent picture projecting operation, a cell responsive to light passed through said sound images, a source for projecting light through said sound images and thence upon said cell, and threading mechanism, said threading mechanism including means for initially producing loops of slack film for cooperation with said intermittent feeding means, means for initially rendering said light source effective upon said cell, and interlocked actuating means for said loop-producing means and said means for initially rendering said light source effective upon said cell.

53. In an apparatus for handling a film having thereupon pictorial images and images representing sound, means for intermittently feeding the film for projecting pictures from said pictorial images, means for feeding the film continuously for producing sound from said sound images, a cell responsive to light passed through said sound images, a source for projecting light through said sound images and thence upon said cell, and threading mechanism, said threading mechanism including means for initially producing loops of slack film for cooperation with said intermittent feeding means, means for starting the operation of said cell, and control means operatively interconnecting said loop-producing means and said starting means for operating both of the same.

54. In an apparatus for handling a film having thereupon pictorial images and images representing sound, means for feeding the film intermittently so that said pictorial images may be projected therefrom, means for feeding the film continuously so that said sound may be reproduced, means for reproducing sound from said images, and threading means, said threading means including means for rendering said sound reproducing means initially operative, means for initially forming an unsupported loop of slack in the film between said intermittent and continuous feeding means by moving the film out of the direct path between said feeding means, and control mechanism operatively interconnecting said means for rendering said sound reproducing means initially operative and said means for initially forming a loop of slack film and effective for operating both of the same.

55. In an apparatus for handling a film having thereupon pictorial images and images representing sounds, means for feeding the film intermittently so that said pictorial images may be projected therefrom, means for feeding the film continuously so that said sound images may be reproduced, means for reproducing sound from said images, and threading means, said threading means including means for rendering said sound reproducing means initially operative, means for initially forming an unsupported loop of slack in the film between said intermittent and continuous feeding means by moving the film out of the direct path between said feeding means, and sequential control mechanism operatively interconnecting said means for rendering said sound reproducing means initially operative and said loop forming means and including devices for first operating said loop forming means and thereafter operating said means for rendering said sound reproducing means initially operative.

56. In an apparatus for handling a film having thereupon pictorial images and images representing sound, two continuously operable film supporting members between which a film extends, an intermittent member engaging the film between said continuous members for advancing said film from one toward the other thereof, means for compensating the difference in character of movement of said continuous and said intermittent members, said compensating means including means for increasing the length of the stretch of the film between said continuous members, means for operating said compensating means, a source for passing light through said sound images upon said film, a photo-electric cell so positioned as to receive light from said source after it has passed through said sound images, means operated by said cell under the influence of light from said source which has passed through said images and impinged upon said cell for reproducing the sound represented by said images, means for controlling the operation of said cell, and an operating connection between said means for operating said compensating means and said cell controlling means for operating said cell controlling means in cooperation with the operation of said means for operating said compensating means.

57. In an apparatus for handling a film having thereupon pictorial images and images representing sound, two film supporting members, an operable gate disposed therebetween through which the film passes from one of said supporting members to the other, control means for operating said gate, a source for passing light through said pictorial images while said film is passing through said gate, a sound head, continuously operating means for moving said film through said sound head in synchronism with the movement of said film through said picture gate, said sound head including a source for passing light through said sound images upon said film as said film passes through said sound head and a photo-electric cell so positioned as to receive light from said source, sound reproducing mechanism operated by said cell under the influence of light from said sound images whereby sound is reproduced in synchronism with the projection of pictures through said picture gate, means for preventing light from said source reaching said cell, and an operating connection between said gate control means and said light preventing means for operating said light preventing means in cooperation with the operation of said gate control means.

58. In an apparatus for handling a film having thereupon pictorial images and images representing sound, two film supporting members, an operable gate disposed therebetween through which the film passes from one of said supporting members to the other, a first control means for operating said gate, a source for passing light through said pictorial images while said film is passing through said gate, a sound head, continuously operating means for moving said film through said sound head in synchronism with the movement of said film through said picture gate, said sound head including a source for passing light through said sound images upon said film as said film passes through said sound head and a photo-electric cell so positioned as to receive light from said source, sound reproducing mechanism operated by said cell under the influence of light from said sound images whereby sound is reproduced in synchronism with the projection of pictures through said picture gate, a second control means for controlling the operation of said sound reproducing mechanism, and an operating connection between said first and second control means for operating each of said means in cooperation with the operation of the other thereof.

59. In an apparatus for handling a film having thereupon pictorial images and images representing sound, two film supporting members, operable guiding mechanism disposed between said supporting members, said guiding mechanism including film contacting members alternatively disposable in a threading and a projecting position, control means for moving said film contacting members between said positions, a source for passing light through said sound images upon the film, a photo-electric cell so positioned as to receive light from said source after it has passed through said sound images, means for preventing light from said source reaching said cell, means for reproducing sound operated by said cell and an operating connection between said control means and said light preventing means for operating said light preventing means in cooperation with the operation of said control means.

60. In an apparatus for handling a film having thereupon pictorial images and images representing sound, two film supporting members, operable guiding mechanism disposed between said supporting members, said guiding mechanism including film contacting members alternatively disposable in a threading position and a projecting position, control means for moving said film contacting members between said positions, a source for passing light through said sound images upon the film, a photo-electric cell so positioned as to receive light from said source after it has passed through said sound images, means operated by said cell for reproducing sound, means for controlling the operation of said sound reproducing means, and an operating connection between said control means and said means for controlling the operation of said sound reproducing means for actuating said means for controlling the operation of said sound reproducing means in cooperation with the actuation of said control means.

61. In an apparatus for handling a film having thereupon pictorial images and images representing sound, two film supporting members, operable guiding mechanism including film contacting members disposable in either a threading or a projecting position, means for moving said film contacting members between said positions, a source for passing light through said sound images upon said film, a photo-electric cell so positioned as to receive light from said source after it has passed through said images, sound reproducing mechanism operated by said cell under the influence of light from said source which has passed through said sound images and impinged upon said cell for reproducing the sound represented by said sound symbols, means for controlling the operation of said cell, and an operating connection between said moving means and said cell-controlling means for operating said cell-controlling means in cooperation with the operation of said moving means.

62. In an apparatus for handling a film having thereupon pictorial images and images representing sound, a member for moving said film, continuously operating means for driving said member, means for applying the power of said driving means to said member, a source for passing light through said sound images, a photo-electric cell so positioned as to receive light form said source after it has passed through said sound images, sound reproducing means operated by said cell, means for preventing light from said source reaching said cell, and an operating connection between said power applying means and said light preventing means for operating said power applying means and said light preventing means in cooperation one with the other.

63. In an apparatus for handling a film having thereupon pictorial images and images representing sound, two film supporting members, a picture gate disposed therebetween through which the film passes from one of said supporting members to the other, a member disposed adjacent said picture gate for intermittently feeding the film therethrough so that said pictorial images may be projected, means for rendering said intermittent feeding means initially effective to advance said film, a sound head, continuously operating means for moving said film through said sound head in synchronism with the movement of said film through said picture gate, said sound head including a source for passing light through said sound images upon said film as said film passes through said sound head and a photo-electric cell so positioned as to receive light from said source, sound reproducing mechanism operated by said cell, means for rendering said light source initially effective upon said cell, and an operating connection between said means for rendering said intermittent feeding means initially effective to advance said film and said means for rendering said light source initially effective upon said cell for operating both of the same.

64. In an apparatus for handling a film having thereupon pictorial images and images representing sound, two film supporting members, a picture gate disposed therebetween through which the film passes from one of said supporting members to the other, a member disposed adjacent said picture gate for intermittently feeding the film therethrough so that said pictorial images may be projected, means for rendering said intermittent feeding means ineffective to advance said film, a sound head, continuously operating means for moving said film through said sound head in synchronism with the movement of said film through said picture gate, said sound head including a source for passing light through said sound images upon said film as said film passes through said sound head and a photo-electric cell so positioned as to receive light from said source, sound reproducing mechanism operated by said cell, means for rendering said light source ineffective upon said cell, and an operating connection between said means for rendering said intermittent feeding means ineffective to advance said film and said means for rendering said light source ineffective upon said cell for operating both of the same.

65. In an apparatus for handling a film having thereupon pictorial images and images representing sound, means for intermittently feeding said film for projecting pictures from said pictorial images, a sound head for reproducing sound from said sound images, means for continuously advancing said film through said sound head in synchronism with the operation of said intermittent feeding means, a reel having a hub for taking up said film, and threading means, said threading means including operable means for initially starting the operation of said means for continuously advancing said film through said sound head, operable means for guiding said film to and about the hub of said taking up reel, and means operatively interconnecting said two last above recited operable means for operating one thereof concomitantly with the operation of the other thereof.

66. In an apparatus for handling a film having thereupon pictorial images and images representing sound, means for intermittently feeding said film for projecting pictures from said pictorial images, a sound head for reproducing sound from said sound images, means for continuously advancing said film through said sound head in synchronism with the operation of said intermittent feeding means, a reel having a hub for taking up said film, and threading means, said threading means including operable means for initially bringing said film into operative relation with said means for continuously advancing said film through said sound head, operable means for guiding said film to and about said hub of said taking-up reel, means for moving said guiding means to inoperative position, control mechanism positively interconnecting said means for moving said guiding means to said inoperative position and said means for bringing said film into operative relation with said continuous film advancing means for operating one thereof concomitantly with the operation of the other thereof, and a single actuating member for said control mechanism.

67. In an apparatus for handling a film having thereupon pictorial images and images representing sound, means for intermittently feeding said film for projecting pictures from said pictorial images, a sound head for reproducing sound from said sound images, means for continuously advancing said film through said sound head in synchronism with the operation of said intermittent feeding means, a reel having a hub for taking up said film, and threading means, said threading means including operable means for spacing the film and said continuous film advancing means whereby said film advancing means is ineffective to move the film, control means for operating said spacing means, operable means for guiding said film to and about the hub of said taking up reel, and means operatively interconnecting said control means and said guiding means for operating one thereof in cooperation with the operation of the other thereof.

68. In an apparatus for handling a film having thereupon pictorial images and images representing sound, means for intermittently feeding said film for projecting pictures from said pictorial images, a sound head for reproducing sound from said sound images, means for continuously advancing said film through said sound head in synchronism with the operation of said intermittent feeding means, a reel having a hub for taking up said film, and threading means, said threading means including operable means for spacing the film and said continuous film advancing means whereby said film advancing means is ineffective to move the film, a first control means for rendering said spacing means operative, operable means for guiding said film to and about the hub of said taking-up reel, a second control means for rendering said guiding means inoperative, and sequential operating mechanism operatively interconnecting said first and second control means for operating said control means in predetermined successive relation one to the other.

69. In an apparatus for handling a film having thereupon pictorial images and images representing sound, means for intermittently feeding said film for projecting pictures from said pictorial images, a sound head for reproducing sound from said sound images, means for continuously advancing said film through said sound head in synchronism with the operation thereupon of said intermittent feeding means, a reel having a hub for taking up said film, a source of power for driving elements of said apparatus, and threading means, said threading means including means for initially applying power from said source to said means for continuously advancing said film through said sound head, operable means for guiding said film to and about the hub of said taking up reel, and means operatively interconnecting said power applying means and said operable guiding means for operating one thereof in cooperation with the operation of the other thereof.

70. In an apparatus for handling a film having thereupon pictorial images and images representing sound, means for intermittently feeding said film for projecting pictures from said pictorial images, a sound head for reproducing sound from said sound images, means for continuously advancing said film through said sound head in synchronism with the operation of said intermittent feeding means, a reel for taking up said film so continuously advanced through said sound head, a source of power for driving elements of said apparatus, and threading means, said threading means including a first means for initially applying power to said continuous feeding means, a second means for initially applying power to said take-up reel and sequential control mechanism operatively interconnecting said first and second power applying means for successively operating each of said power applying means whereby the beginning of the operation of said continuously advancing means and the beginning of operation of said take-up reel are in successive relation one to the other.

71. In a film handling apparatus, a delivery carrier, a take-up carrier which includes a hub, means forming a channel between said carriers, means for propelling the free end of a film supported upon said delivery carrier through said channel towards said take-up carrier, and intermittently operating feeding member disposed between said carriers and engaging the film for feeding it along said channel, a continuously operating delivery member for drawing film from said delivery carrier and advancing it toward said intermittent member, a continuously operating take-up member for taking up the film advanced by said intermittent member and delivering it to said take-up carrier, movable members for producing loops of slack in the film between each of said continuous members and said intermittent member, means for moving said loop forming members into engagement with the film and across the line of said film channel whereby loops are formed in the film, operable means for guiding the free end of the propelled film about the hub of said take-up carrier, and interlocked operating means for said moving means and said guiding means.

72. In a film handling apparatus, guiding means establishing a path in said apparatus in which a film is initially threaded, an intermittently operated toothed feeding member disposed adjacent said path, a shielding member movable from and to a position wherein it establishes a portion of one side of said threading path and is disposed between the teeth of said feeding member and the film thereby shielding the film from said teeth, a film-engaging loop-forming member movable from a first position wherein it forms a portion of the side of said path opposite that side a portion of which is formed by said shielding member and a second position across said path whereby the film is laterally displaced from said path and a loop is formed therein, means for moving said loop-forming member from said first to said second position and back to said first position, and means for maintaining said loop-forming member in said first position while the film is being fed by said intermittently operated toothed feeding member.

73. In a film handling apparatus having a delivery member and a take-up member, a plurality of instrumentalities disposed therebetween for establishing a threading path for a film, means for propelling the film through said threading path, means for laterally moving certain of said instrumentalities in one direction across said path to provide a plurality of loops in the film and thereafter for moving said instrumentalities in the opposite direction to clear said path so that they will not interfere with the expansion and contraction of such loops during the feeding operation, means for disposing certain of said instrumentalities in cooperative relation with the film to define a feeding path between said delivery member and said take-up member, means for intermittently feeding the film along said feeding path, and sequential control mechanism operatively interconnecting all of said means for predeterminedly and selectively actuating each of said means.

74. In a film handling apparatus having a delivery member and a take-up member, a plurality of instrumentalities disposed therebetween for establishing a threading path for a film, means for initially propelling the free end of the film through said threading path, means for laterally thrusting certain of said instrumentalities in one direction across said path to engage the film and displace it from said path thereby to provide a plurality of loops in the film and thereafter for moving said instrumentalities in the opposite direction to clear said path so that they will not interfere with the expansion and contraction of such loops during the feeding operation, means for disposing certain of said instrumentalities in cooperative relation with the film to define a feeding path between said delivery member and said take-up member, and means for intermittently feeding the film along said feeding path.

75. In a film handling apparatus having a delivery member and a take-up member, a plurality of instrumentalities disposed therebetween for establishing a threading path for a film, means for propelling the film through said threading path, compensating means for laterally moving certain of said instrumentalities in one direction across said path to provide a plurality of loops in the film and thereafter for moving said instrumentalities in the opposite direction to clear said path so that they will not interfere with the expansion and contraction of such loops during the feeding operation, sequential control means operatively interconnecting said compensating means and said propelling means and including devices for first operating said propelling means and thereafter operating said compensating means, means for disposing certain of said instrumentalities in cooperative relation with the film to define a feeding path between said delivery member and said take-up member, and means for intermittently feeding the film along said feeding path.

76. In a film handling apparatus having a delivery member and a take-up member, a plurality of instrumentalities disposed therebetween and movable into a position wherein they establish a threading path for a film, means for moving said instrumentalities into said position, means for propelling the film through said threading path, sequential control means operatively interconnecting said previously mentioned moving means and said propelling means and including devices for maintaining said propelling means inoperative until after said previously mentioned moving means has been operated, means for laterally moving certain of said instrumentalities in one direction across said path to provide a plurality of loops in the film and thereafter for moving said instrumentalities in the opposite direction to clear said path so that they will not interfere with the expansion and contraction of such loops during the feeding operation, means for disposing certain of said instrumentalities in cooperative relation with the film to define a feeding path between said delivery member and said take-up member, and means for intermittently feeding the film along said feeding path.

77. In a film handling apparatus, a plurality of operable parts, a plurality of control stations, a rotatable control disc movable at will to any of said stations and having a plurality of cam formations thereon, said stations representing a particular operation which the apparatus is to perform when the disc is moved to the respective station, a follower for each of said cam formations, a connection between each of said followers and each of said operable parts for operating said part in the manner desired upon the rotation of said rotatable control disc to a predetermined one of said control stations, and means for rotating said control disc.

78. In a film handling apparatus, an openable gate, means for intermittently feeding a film through said gate while it is closed, means for starting the operation of said feeding member, a plurality of control stations, a control member having a plurality of cam formations thereon, connections between said cam formations and said gate and said starting means for operating both of the same upon the movement of said control member to one of said stations, means for moving said control member between said stations, and means independent of said control member for operating said feeding member after it has been started.

79. In a film handling apparatus, an openable gate, means for opening said gate, mechanism for rewinding a film through said gate while it is open, means for starting the operation of said rewinding mechanism, a plurality of control stations, a single rotatable control member having cam formations thereon, connections between said cam formations and said gate and said means for starting the operation of rewinding mechanism for operating each of said means upon the movement of said control member to an appropriate station, and means for rotating said control member between said control stations.

80. In a film handling apparatus, an openable gate, means for laterally positioning a film therewithin, a control member for closing said gate and for operating said lateral positioning means, said control member having cam formations, connections between said cam formations and said gate and said lateral positioning means for operating said lateral positioning means and closing said gate upon the movement of said control member, means for feeding the film through said gate while it is closed, and means for moving said control member.

WARREN DUNHAM FOSTER.
FREDERICK DAVENPORT SWEET.